United States Patent [19]
Yasuda et al.

[11] Patent Number: 5,892,923
[45] Date of Patent: Apr. 6, 1999

[54] PARALLEL COMPUTER SYSTEM USING PROPERTIES OF MESSAGES TO ROUTE THEM THROUGH AN INTERCONNECT NETWORK AND TO SELECT VIRTUAL CHANNEL CIRCUITS THEREWITHIN

[75] Inventors: Yoshiko Yasuda, Kawasaki; Teruo Tanaka, Hadano, both of Japan

[73] Assignee: Hitachi, Ltd., Tokyo, Japan

[21] Appl. No.: 580,257

[22] Filed: Dec. 28, 1995

[30] Foreign Application Priority Data

Dec. 28, 1994 [JP] Japan .................................. 6-326768

[51] Int. Cl.⁶ ................................................ G06F 15/173
[52] U.S. Cl. ............................. 395/200.69; 395/800.29; 370/392
[58] Field of Search ........................... 395/800.01, 800.1, 395/800.11, 200.3, 200.68, 200.78, 311, 312, 800.28, 800.29; 370/392, 389

[56] References Cited

U.S. PATENT DOCUMENTS 5,222,085  6/1993  Newman .................................. 370/422
5,583,990  12/1996  Birrittella et al. .................. 395/800.29

FOREIGN PATENT DOCUMENTS 63-124162  5/1988  Japan .

OTHER PUBLICATIONS

H. Park et al. "WICI: An Efficient Switching Scheme for Large Scalable Networks", Parallel and Distriubted Processing, 1994 proceeding, pp. 385–392. CD. IEE/IEEE IHS Electronic Lib.

F.C.M. Lau et al. "Propagating Buffer: A new approach to deadlock freedom in store–and–forward networks", Parallel and Distriubted Processing, 1991 proceeding, pp.804–807. CD. IEE/IEEE IHS Electronic Lib.

Awerbuch et al. "On Buffer–Economical Store–and–Forward Deadlock Prevention", IEEE publication pp.4D.1.1 –4D.1.5. CD. IEE/IEEE IHS Electronic Lib., 1991.

Shen et al. "The B–&–E Model for Adaptive Wormhole Routing", Parallel and Distributed Processing, 1993, pp. 170–173. CD. Proquest IEEE/IEE Publications Ondisc.

Information Processing Society of Japan, Proc. of Symposium on Parallel Processing JSPP '94 pp. 129–136 (1994).

Information Processing Society of Japan, IPSJ SIG Notes ARC, vol. 92, No.64 pp. 89–96 (1992).

"Virtual–Channel Flow Control", William J. Dally, IEEE Transactions on Parallel and Distributed Systems, vol. 3, No.2 (1992).

*Primary Examiner*—Dinh C. Dung
*Attorney, Agent, or Firm*—Antonelli, Terry, Stout & Kraus, LLP

[57] ABSTRACT

A parallel computer using a simply structured network which allows loads on message-transferring routes to be as equally distributed as possible and which eases possible conflict between different types of messages being transferred. Given a message to be transmitted, each processor (PE) on the network references a property setup table to determine property information depending on the message type and places the information into the message. For example, a route bit RB as the property information is set to "0" or "1" depending on whether the message is originated by the sending PE or is a message acknowledging the receipt of another message. According to the RB bit in the received message, a route instruction circuit in each exchange switch (EX) references a route instruction table to determine the message destination that depends on the receiving PE number designated by the message. Each EX has a plurality of virtual channel circuits. Each virtual channel circuit has a plurality of buffers assigned beforehand to different values of the RB bit within the message. The received message is placed into the buffer corresponding to the RB bit value of the message, whereby conflict between messages is minimized.

23 Claims, 17 Drawing Sheets

FIG. 7

| RB BIT | CONDITION | | OUTPUT |
|---|---|---|---|
| 0 | DX > 0 | | PRIORITY CIRCUIT 611 |
| | DX = 0 | DY > 0 | PRIORITY CIRCUIT 614 |
| | | DY = 0 | PRIORITY CIRCUIT 615 |
| | | DY < 0 | PRIORITY CIRCUIT 613 |
| | DX < 0 | | PRIORITY CIRCUIT 612 |
| 1 | DY > 0 | | PRIORITY CIRCUIT 614 |
| | DY = 0 | DX > 0 | PRIORITY CIRCUIT 611 |
| | | DX = 0 | PRIORITY CIRCUIT 615 |
| | | DX < 0 | PRIORITY CIRCUIT 612 |
| | DY < 0 | | PRIORITY CIRCUIT 613 |

NOTE
  IF RB=1, DX IS EQUAL TO DIFFERENCE BETWEEN X
        COORDINATE WITHIN A RECEIVING-PE NUMBER
        AND X COORDINATE OF A CURRENT EX,
        AND DY IS EQUAL TO DIFFERENCE BETWEEN Y
        COORDINATE WITHIN THE RECEIVING-PE NUMBER
        AND Y COORDINATE OF THE CURRENT EX.
  IF RB=0, DX IS EQUAL TO DIFFERENCE BETWEEN X
        COORDINATE WITHIN A SENDING-PE NUMBER
        AND X COORDINATE OF A CURRENT EX,
        AND DY IS EQUAL TO DIFFERENCE BETWEEN Y
        COORDINATE WITHIN THE SENDING-PE NUMBER
        AND Y COORDINATE OF THE CURRENT EX.

FIG. 11A
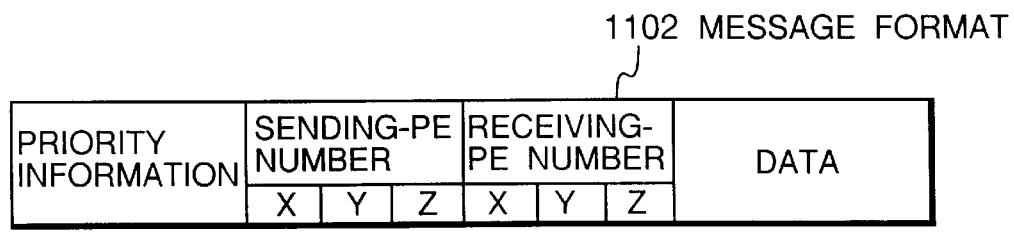
1102 MESSAGE FORMAT
FIG. 11B
| INSTRUCTION | INSTRUCTION CODE | PRIORITY INFORMATION |
|---|---|---|
| NORMAL | 00111 | 001 |
| EMERGENCY | 10101 | 010 |
| BROADCAST | 00100 | 100 |
| SYNCHRONIZATION | 10110 | 111 |
1101 PRIORITY SET UP TABLE
FIG. 11C
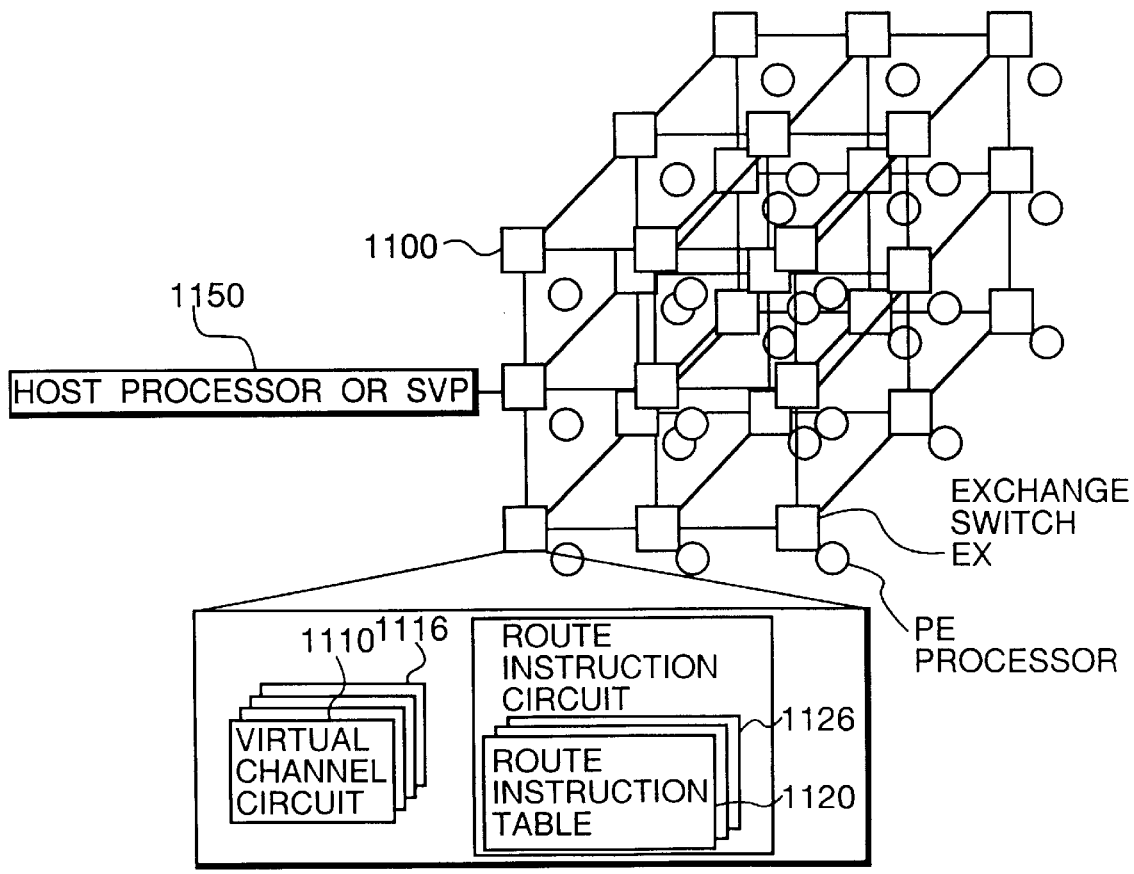

FIG. 13

1120 ROUTE INSTRUCTION TABLE

| PRIORITY INFORMATION | ROUTING ORDER |
|---|---|
| 001 | X→Y→Z |
| 010 | Y→Z→X |
| 100 | Z→X→Y |
| 111 | Y→X→Z |

1500 ROUTE INSTRUCTION CIRCUIT

PARALLEL COMPUTER SYSTEM USING PROPERTIES OF MESSAGES TO ROUTE THEM THROUGH AN INTERCONNECT NETWORK AND TO SELECT VIRTUAL CHANNEL CIRCUITS THEREWITHIN

BACKGROUND OF THE INVENTION

The present invention relates to a parallel computer comprising a plurality of processors constituting a network for transferring messages therebetween.

One of the capabilities required of the network of the parallel computer is a high throughput, i.e., the ability to transmit a large number of messages in a short time.

A majority of conventional parallel computers operate under what is known as the dimension ordered routing scheme for network routing. Dimension ordered routing involves transmitting all messages from, say, a one-dimensional direction to a two-dimensional direction in the same transfer procedure. The same applies when a path conflict occurs between different messages. In the case of such a conflict, the initially transmitted message is given priority in transfer over the subsequently transmitted message. Where dimension ordered routing is employed, a transfer route not actually used can develop on the network. In a conventional dimension ordered routing setup, messages may concentrate on a specific portion of the network or may not use certain routes at all. That is, part of the transfer routes on the network are not utilized effectively. Incidentally, the message conflict refers to cases where the transfer route of one message conflicts with that of another message so that one of the messages is delayed in transfer.

One solution to the above problem is the so-called adaptive routing disclosed in the Papers from Information Processing Society of Japan, Proc. of Symposium on Parallel Processing JSPP '94, pp. 129–136, May 1994 (hereafter referred to as the first-cited reference). The adaptive routing scheme attempts to disperse transfer routes of messages over the network by utilizing the routes effectively. The first-cited reference discusses cases in which adaptive routing is applied to a hyper-crossbar network.

The disclosed adaptive routing method works as follows: When a path conflict occurs as mentioned, the message later transmitted is transferred on the spot to a currently available route (in a different dimensional direction). This resolves the conflict state. By distributing messages to different transfer routes, the adaptive routing method utilizes all transfer routes on the network effectively and makes the load on each of the transfer routes as equally distributed as possible.

There is one major disadvantage to the network enabling a plurality of transfer routes to transfer messages to the same destination: there may occur a closed loop of a channel chain between a plurality of messages. That is, each of, say, two messages attempts to take over the transfer route of the other message, resulting in a deadlock. Illustratively, suppose that in a three-dimensional network situation, a message 1 is to be transmitted over routes X, Y and Z in that order while a message 2 is to be sent over routes Y, Z and X in that order. As the message 1 is trying to take the route Z and the message 2 the route X, a loop is formed between the two transfer routes leading to a deadlock. The Way to avoid the deadlock proposed in the first-cited reference involves using virtual channels on the hyper-crossbar network. Virtual channels are made up of a plurality of independent buffers (i.e., virtual channels) for storing messages with respect to each physical channel of the network. A plurality of virtual channels share one physical channel. The first-cited reference explains how the deadlock state is resolved by utilizing virtual channels on the hyper-crossbar network. What follows is a description of how virtual channels are used.

The hyper-crossbar network illustratively includes "in" processors, "n" being factorized into n1×n2×n3× . . . , nm. Each of the factors is regarded as a one-side mesh crosspoint count constituting an m-dimensional mesh space in which processors are disposed. The sides of the mesh are connected by partial networks composed of crossbar switches so as to form message transfer routes. In this example, each crossbar switch is provided with as many buffers as the number of dimensions (m). One physical channel is used as "m" virtual channels. Illustratively, in the above-described three-dimensional network, an adaptive routing scheme based on virtual channels allows the message 1 to be transferred over routes X1, Y2 and Z3 in that order, and enable the message 2 to be moved through routes Y1, Z2 and X3 in that order (subscripts 1, 2 and 3 added to characters X, Y and Z indicate virtual channel numbers). This prevents any closed loop from developing between the routes thereby avoiding deadlock. In this example, it is possible to select any dimension when each crossbar switch is transited provided the selected dimension has not been passed through in the past.

Virtual channels are allocated depending on the number of crossbar switches transited so far by the message in question. Each message contains therein dynamic transfer route transit information (describing, among others, which switches the message in question has transited so far) in order to suppress deadlock.

The concept of virtual channels was proposed earlier in IEEE TRANSACTIONS ON PARALLEL AND DISTRIBUTED SYSTEMS, Vol. 3, No. 2, pp. 194–205, March 1992 (hereafter called the second-cited reference). This reference also indicates that the deadlock state is avoided by applying virtual channels to a torus network based on dimension ordered routing.

Another capability required of the network of the parallel computer is a minimized possibility of conflict between different types of messages. These types of messages transferred over the network of the parallel computer include broadcast messages, synchronization messages, data transfer messages and emergency messages and so on. They vary in type depending on the purpose. If a conflict occurs between such different types of messages, one of the messages (e.g., emergency message) can be delayed in transfer.

Some parallel computers have a plurality of message-wise networks for the efficient transfer of messages differing in their purposes. For example, the parallel computer introduced in Information Processing Society of Japan, IPSJ SIG Notes ARC, Vol. 92, No. 64, pp. 89–96 (hereafter called the third-cited reference) have three independent networks: one for broadcast messages, another for synchronization messages and another for data transfer messages.

Japanese Patent Laid-Open No. Sho 63-124162 (hereafter called the fourth-cited reference) discloses a technique whereby, in case of a fault on the network, the current message transfer route is switched so as to bypass the faulty network portion. According to the disclosed technique, the message route is designated by the message-originating processor inserting routing bits into its message.

SUMMARY OF THE INVENTION

According to the dynamic adaptive routing scheme described in the first-cited reference, all transfer routes on the network may be used. This makes it possible to keep the load on each of the transfer routes as equally distributed as possible. However, to implement this feature requires knowing which message transits which route when transferred. That is, the network must have numerous circuits for dynamically writing to each message the transfer route transit information (describing, among others, which switches the message in question has transited so far). The requirement complicates the switch arrangement constituting part of the network.

In the conventional network of the parallel computer discussed in the third-cited reference, a plurality of networks are provided to deal independently with different types of messages. Thus there exists no conflict between different messages. However, if the parallel computer involves thousands of processors, it is still necessary to furnish as many structurally complex networks as the number of the message types involved. This means huge network costs. By contrast, the network described in the first-cited and second-cited references is a single network that transmits a plurality of types of messages. The network cost in this case is low but there is no easing of possible conflict between different types of messages being transferred.

The technique discussed in the fourth-cited reference allows message routes to be switched but only when a network fault has developed or when the current fault is removed. Because the route does not change for each message, it is not possible to implement the balanced distribution of loads throughout the network.

It is therefore a first object of the present invention to provide a parallel computer using a simply structured network allowing loads on message-transferring routes to be as equally distributed as possible.

It is a second object of the present invention to provide a parallel computer using a simply structured network which enables a plurality of types of messages to be transferred while easing possible conflict between different types of messages.

The first object of the present invention may be achieved according to a first aspect thereof, which provides a parallel computer with a network comprising a plurality of switch circuits. Each switch circuit is provided with a control circuit that controls the destination of the message, received by the corresponding switch circuit, in accordance with the address information and property information held in the message. When the transfer route of a given message is determined by the control circuit, a plurality of other messages having address information designating the same destination processor may be transferred via different routes that vary with the property information in the respective messages. This makes it possible to distribute the loads on the transfer routes as equally as possible. The network of the parallel processor as embodied here utilizes for routing purposes the information attached to each message by the message-originating processor before the message in question is placed onto the network. Because there is no need to add information to messages within the network, this network is made simpler in structure than that described in the first-cited reference.

In a preferred structure according to the first aspect of the invention, there is provided in each processor a circuit for generating transfer control information based on the message type information within a message to be transmitted from the processor to the network, the circuit further supplementing the message with the transfer control information thus generated as property information. The switch circuits inside the network are each designed to work in response to this transfer control information. Typical message types include a request message for requesting a response from another processor and a response message for responding to the request message. Further message types illustratively include an emergency message that needs to be transferred more quickly than any other message, a synchronization message that adjusts the operation timing between processors, and a normal data transfer message.

In a further preferred structure according to the first aspect of the invention, there is provided in each processor a circuit for generating message priority information based on the message type information within a message to be transmitted from the processor to the network, the circuit further supplementing the message with the message priority information thus generated as property information. The switch circuits inside the network are each designed to control the message transfer route in response to this message priority information.

The second object of the present invention may be achieved according to a second aspect thereof, which provides a parallel computer with a network comprising a plurality of switch circuits. Each switch circuit is provided with a plurality of virtual channel circuits corresponding to a plurality of input terminals. Each virtual channel circuit includes a plurality of buffers for holding at least part of the message (i.e., each buffer is at least large enough to accommodate the entire message part needed to decode address information). Also included in each virtual channel circuit is a selecting circuit that selects one of the corresponding buffers to accommodate a message, the selection being performed in accordance with the property information specific to the type of the message entered from the corresponding input terminal. The selecting circuit works to let the buffers within the virtual channel circuit retain messages of the types specific to each buffer. This eliminates the possibility of different types of messages conflicting with one another as to the use of buffers inside each virtual channel circuit.

Furthermore, each of at least part of the switch circuits is provided with a selection control circuit. When the switch circuit in question uses a route selecting circuit to select the destination of a message within a virtual channel on the basis of the address information in that message, the selection control circuit controls selection of the message destination in accordance with the property information inside the message in question. Thus the above-mentioned part of the switch circuits determine the transfer route of a given message in accordance with the address information and property information held in the message. This minimizes the possibility of different types of messages conflicting with one another as to the use of a transfer route. Because the network utilizes for routing purposes the information added to each message by the corresponding processor upon transmission, the network is made simpler in structure than that of the first-cited reference.

In a preferred structure according to the second aspect of the invention, there is provided in each processor a circuit for generating transfer control information based on the message type information within a message to be transmitted from the processor to the network, the circuit further supplementing the message with the transfer control information thus generated as property information. The circuit to select the buffer for accommodating a message in each switch circuit of the network is designed to respond to this transfer control information. The control circuit in each of the above-mentioned part of the switch circuits controls the transfer route of the message in question by responding to this transfer control information.

In a further preferred structure according to the second aspect of the invention, there is provided in each processor a circuit for generating message processing priority information based on the message type information within a message to be transmitted from the processor to the network, the circuit further supplementing the message with the message processing priority information thus generated as property information. The circuit to select the buffer for accommodating a message in each switch circuit of the network is designed to respond to this message processing priority information. The control circuit in each of the above-mentioned part of the switch circuits controls the transfer route of the message in question by responding to this priority information.

These and other objects, features and advantages of the invention will become more apparent upon a reading of the following description and appended drawings.

BRIEF DESCRIPTION OF THE DRAWINGS

FIG. 7 is a table of output signals from an address decoder (606) included in FIG. 6;

FIG. 11A is a view of a message format for use by a second embodiment of the invention;

FIG. 11B is a view showing the constitution of a priority setup table for use by the second embodiment;

FIG. 11C is a schematic view showing the constitution of a parallel computer practiced as the second embodiment;

FIG. 13 is a view depicting the internal constitution of a route instruction table included in FIG. 11C;

DESCRIPTION OF PREFERRED EMBODIMENTS

Figure 1:
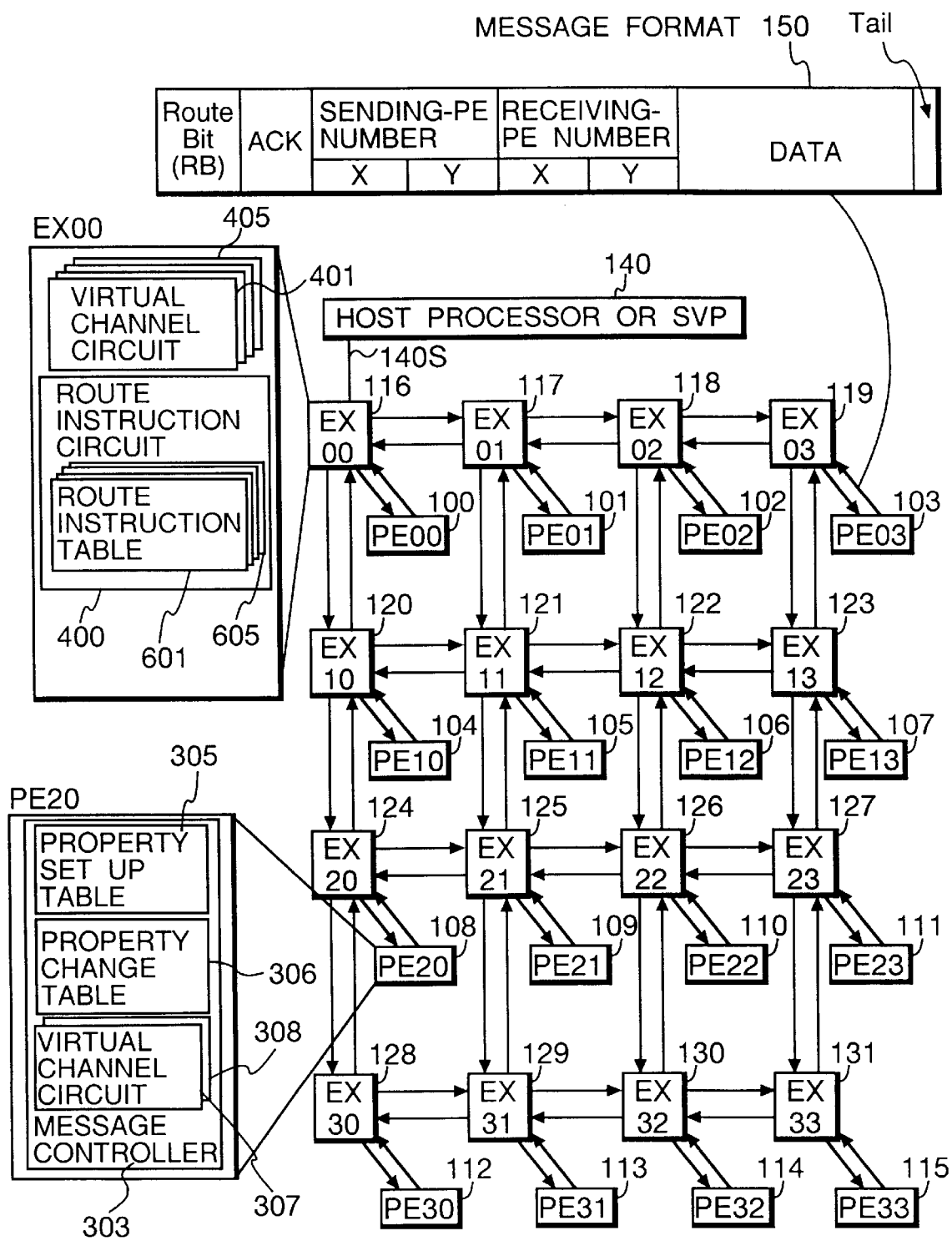
FIG. 1 is a schematic view showing the constitution of a parallel computer practiced as a first embodiment of the invention.

Some preferred embodiments of the present invention will now be described in detail with reference to the accompanying drawings. Each of the embodiments is a parallel computer using a network. In the description that follows, like reference numerals designate like or corresponding parts.

First Embodiment

The first embodiment of the invention is a parallel computer having a two-dimensional mesh-connected network. When different types of messages are to be transmitted, the first embodiment establishes a different and independent routing order for each of the different message types (e.g., a request message for requesting data transfer, and a response message for returning the data requested by the request message). This arrangement is intended to distribute message-related loads optimally throughout the network. Specifically, the message loads on the routes of the network are distributed as equally as possible by use of independent routing orders for different message types. Each of the switches in the network is provided with a plurality of virtual channel circuits each including a plurality of buffers. The buffers in each virtual channel circuit are used to hold at least part of a specific type of message (i.e., part of a single message). This contributes to minimizing the possible conflict between different types of messages.

FIG. 1 schematically shows the constitution of the parallel computer practiced as the first embodiment of the invention. In FIG. 1, reference numerals 100 through 115 are processors (abbreviated to PEs hereunder) constituting the parallel computer. Reference numerals 116 through 131 indicate exchange switches (abbreviated to EXs hereunder). Reference numeral 140 denotes a host computer or a service processor (SVP). These components combine to load programs and data into the PEs 100 through 115 and to read the resulting data from each PE upon completion of program execution.

Each PE has a message controller 303 that controls assembly (generation), transfer and reception of messages. The message controller 303 comprises a property setup table 305, virtual channel circuits 307 and 308, and a property change table 306. The property setup table 305 is used to determine property information to be attached to an outgoing message from the PE. The virtual channel circuit 307 retains the generated message temporarily. The virtual channel circuit 308 temporarily holds the message received from the network. The property change table 306 is used to determine the value of a route bit (RB) for use upon transmission of a response message in response to the received message.

Each PE (processor) is furnished beforehand with the X and Y coordinates of a single lattice point in a two-dimensional coordinate space as the PE number. One EX is arranged to correspond with one PE. In the description that follows, each EX is given the same number as that of the corresponding PE. Although the current example is a parallel computer involving four groups of PEs arranged in the Y axis direction, each group comprising four PEs arranged in the X axis direction, this is not limitative of the invention. In practice, any number of PEs may be provided to form a parallel computer. Although the example is a two-dimensional parallel computer, the invention also applies to an n-dimensional parallel computer setup, "n" being an integer.

Each EX (exchange switch) is a circuit that transfers to an adjacent EX or PE the message forwarded from the corresponding PE or from an adjacent EX. With the first embodiment, the EXs are connected in lattice fashion to form a mesh-connected network. Each EX has a plurality of virtual channel circuits 401 through 405 for holding at least part of the message, and a route instruction circuit 400 for determining the next EX to send the message to. The route instruction circuit 400 includes route instruction tables 601 through 605 for designating a routing order as per the property information in the received message.

Reference numeral 150 indicates the format of a message to be transmitted over the network. Each message is made up of a property field, an address field and a data field. The property field contains transfer control information (route bit, or RB) and acknowledgment information (ACK). The route bit RB indicates the property of the message determined by the message type, and is used to control determination of a message transfer route by the EX. The first embodiment varies the value of the RB bit depending on whether the message to be sent by a PE is the first message to be transmitted by that PE, or is a response message transmitted in response to the message received from another PE. For example, RB=0 if the message is the first message to be transmitted; RB=1 if the message is a response message. When sending a message to another PE, the PE sets the RB bit in accordance with the property setup table 305 (to be described later with reference to FIG. 3). When the receiving PE transmits a response message telling the sending PE that its message has arrived, the receiving PE changes the RB bit to "1" in the response message in accordance with the property change table 306 (to be described later with reference to FIG. 3). The acknowledgment information (ACK) indicates whether a response is needed to the transferred message. Illustratively, the ACK bit is set to "1" if a response is necessary and to "0" if no response is required. The ACK bit may be set either by the operating system or by a user manipulating a communication instruction in a program. The address field holds a sending PE number (X, Y) and a receiving PE number (X, Y). The sending PE number is the number identifying the PE that transmits a message; the receiving PE number is the number identifying the PE that receives the message. For the sake of explanation, the sending and receiving PE numbers here are both expressed in two-dimensional coordinates (X, Y). The data field contains the data to be transmitted. The message is generally suffixed with tailing information (TAIL). If this information (TAIL) is not used, a message length is set in the property field.

A first characteristic of the first embodiment is that the message controller 303 of a PE attaches the route bit (RB) of a different value to the message bound for the network depending on whether that message is a message whose transmission is requested by the CPU, or is a response message issued in response to the message received from another PE.

A second characteristic of the first embodiment is that each EX determines the destination of the message on the basis of both the value of the routing bit RB and the receiving PE number identifying the destination of the message. When different messages are bound for the same receiving PE, the above two characteristics of the first embodiment cause the messages to move through different transfer routes depending on the message types eventually to reach their destination.

A third characteristic of the first embodiment is that a plurality of buffers in each of a plurality of virtual channels in each EX are controlled so as to hold selectively messages having specific routing bit values. This characteristic prevents messages of different types from conflicting with one another as to the use of buffers in each virtual channel.

Figure 2:
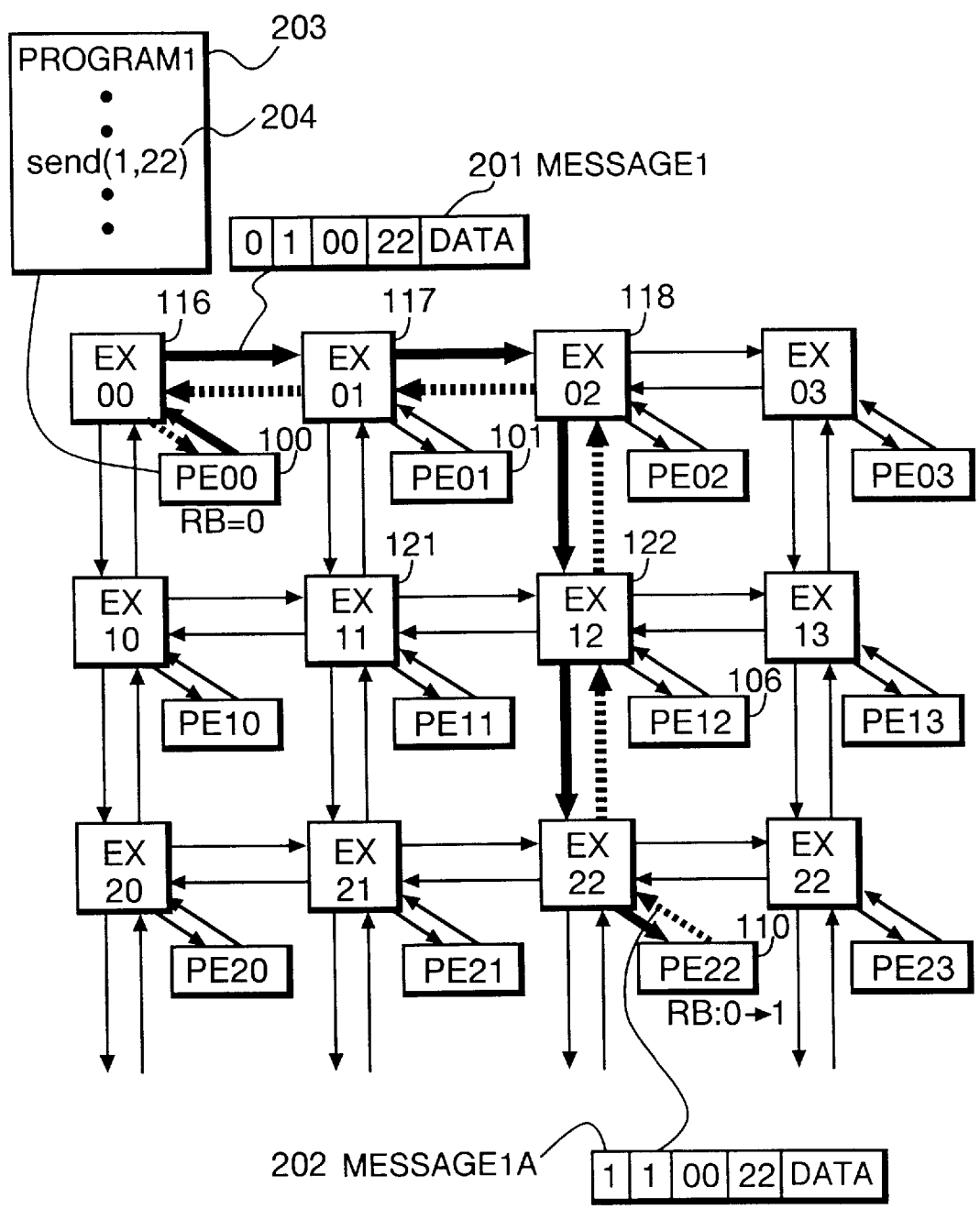
FIG. 2 is a schematic view outlining the flow of message transfer in the first embodiment.

FIG. 2 outlines how the first embodiment operates. In FIG. 2, a PE00 sends a message 1 (201) to a PE22, and the PE22 returns a response message 1A (202) to the PE00. In the messages 201 and 202, the values 0 and 1 of the first word denote property information RB of the respective messages. In FIG. 2, the PE00 executes a program 1 (203). The value 1 in a communication instruction SEND (1, 22) 204 indicates that a response is required and the value 22 therein denotes the receiving PE number. The message controller 303 in the PE00 sets "1" to the acknowledgment information (ACK) and "22" to the sending PE number in accordance with the communication instruction 204. Because the message is to be originated from the corresponding PE, the message controller 303 generates the message 1 by setting "0" to the transfer control information RB. If the communication instruction 204 specifies no need for a response, the message controller 303 sets "0" to the acknowledgment information (ACK). Setting of values to the ACK and RB bits in the message is effected in FIG. 3 by decoding the communication instruction 204 and by following the logic indicated in the property setup table 305 established accordingly. The message 1 generated by the message controller 303 is placed into a buffer 0, not shown, corresponding to RB=0 inside the virtual channel circuit 307. The message 1 (201) output by the PE00 selects the buffer 0 (504 in FIG. 5) when relayed by, say, the EX00 because the RB bit is set to "0" in the message 1. Given the RB bit, the route instruction circuit 400 references the route instruction table 601 and other appropriate resources. Using the result of the reference and the receiving PE number, the route instruction circuit 400 determines the next route through which to transfer the message. If the RB bit is set to "0," the first embodiment initially transfers the message 1 in the horizontal direction of the figure (X axis direction). Thus the message 1 is transferred to the EX01 and EX02, in that order. At the EX02, the X coordinate of the receiving PE number in this message coincides with the X coordinate of the EX02. As a result, the message 1 is transferred in the vertical direction of the figure (Y axis direction). Passing through the EX12 and EX22, the message 1 reaches the PE22 that is the receiving PE.

Upon arrival at the PE22, the message 1 is stored into the buffer 0, not shown, inside the virtual channel circuit 308. Because the acknowledgment information ACK in the received message is "1," the message controller 303 in the PE22 changes the RB bit in the received message from "0" to "1" as per the property change table 306. That is, the message controller 303 generates a response message 1A with its RB bit set to "1," places the message 1A in the buffer 1 inside the virtual channel circuit 307, and transfers the message 1A to the sending PE. When the RB bit in the message 1A from the PE22 is found to be 1, an exchange switch EX (e.g., EX22) transfers the message 1A in the vertical direction of the figure (Y axis direction). Thus the response message 1A moves past the EX12 and EX02 and is relayed by the EX01 and EX00. With RB=1 in the message 1A, the virtual channel circuit of the EX in question selects the buffer 1. Given the value of the RB bit, the route instruction circuit 400 references the route instruction tables accordingly. Using the result of the reference and the sending PE number, the route instruction circuit 400 determines the next route through which to transfer the message. Because the RB bit in the message 1 (201) differs from the RB bit in the message 1A (202), the routing order differs as illustrated (the order means whether the message is first routed either in the X or in the Y direction).

How a message is generated by a PE20 will now be described with reference to FIG. 3. All PEs are identical in hardware constitution. The PE comprises a memory 301 that stores data and programs, a CPU 302 that executes programs using data, and a message controller 303 that controls messages transferred from the CPU or EXs, the components being each operable independently. The message controller 303 has a property setup table 305 for setting property information RB according to the communication instruction sent from the CPU; a property change table 306 for changing the property information RB in accordance with the message from EXs; a message generating circuit 304 for generating a message based on the communication instruction, property information RB and data; and virtual channel circuits 307 and 308.

In the property setup table 305 is set the acknowledgment information ACK as a result of having decoded the communication instruction from the CPU. For example, where an ordinary data communication instruction specifies no need for a response, the first embodiment sets the ACK bit to "0"; if an ordinary communication instruction designates the need for a response, the first embodiment sets the ACK bit to "1." The need or no need for a response may be described in the form of an instruction argument in the program as shown in FIG. 2. Alternatively, a dedicated instruction for setting the ACK bit may be provided separately. Every instruction from the CPU has its RB bit set to "0." The property setup table 305 may be implemented either by software or by hardware.

The message generating circuit 304 generates a message in the format 150 of FIG. 1 using the property setup table 305 or property change table 306, the result of decoding of the instruction, and data from the memory 301. The message thus generated is transferred from the message generating circuit 304 to the corresponding EX. Generation of the message may be effected on a software basis or by use of dedicated hardware.

The property change table 306 is used to decide, in accordance with the ACK and RB bits in the message transmitted over the network, whether the received message is to be simply admitted to the CPU (or memory) or a response message (with its RB=1) corresponding to the received message is to be transferred to the EX. For example, when the RB bit is "1" (ACK bit not considered) or when the ACK bit is "0" (no response needed; RB bit not considered) in the received message, the first embodiment transfers the data within the received message to the CPU or memory for subsequent processing by program. When ACK=1 and RB=0 in the received message, the data contained in the message is admitted to the CPU or memory for subsequent processing by program. Concurrently, upon message receipt confirmation by the CPU, the RB bit is set to "1" in a response message, the bit value being used by the message generating circuit 304 in generating the latter message. FIG. 3 shows illustratively that when the ACK and RB settings in the property change table 306 coincide with the corresponding values in the received message, the data of the message is transferred to the CPU and that when ACK=1 and RB=0, message receipt confirmation by the CPU causes the RB bit to be set to "1" in a response message, the bit value being used by the message generating circuit 304 in generating the latter message. The table 306 is called the property change table because the RB value of the response message is changed to "1" in response to the value of the RB bit in the received message being "0."

The virtual channel circuits 307 and 308 determine the buffer to be used depending on the property information in the message to be accommodated. Because these circuits are identical in structure to virtual channel circuits 401 through 405 (FIG. 5), to be described later, inside the EX, the circuits 307 and 308 will not be described here further.

Figure 4:
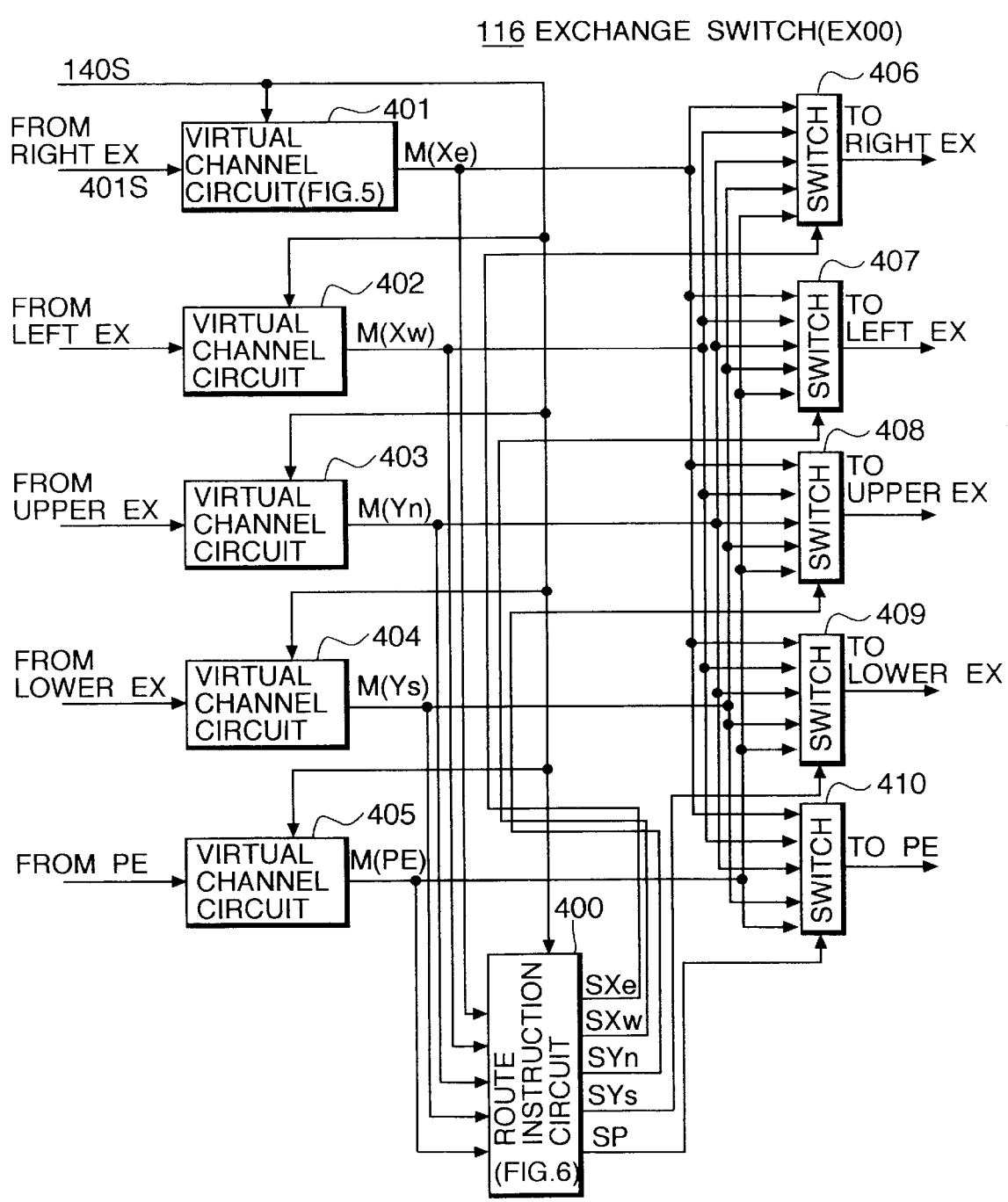
FIG. 4 is a schematic view of exchange switches in the first embodiment.

How an EX controls messages will now be described with reference to FIG. 4. All EXs are the same in hardware constitution. The EX comprises a route instruction circuit 400, virtual channel circuits 401 through 405, and switches 406 through 410. The virtual channel circuits 401 through 404 deal with messages transmitted from other exchange switches (EXs), and the virtual channel circuit 405 addresses messages from the PE. The switches 406 through 410 select the message to be transmitted in accordance with a signal from the route instruction circuit 400. The selected message is transferred to an adjacent EX or to the PE. The route instruction circuit 400 determines the message destination according to the transfer control information contained in the message, and outputs the signal to the switches.

Figure 5:
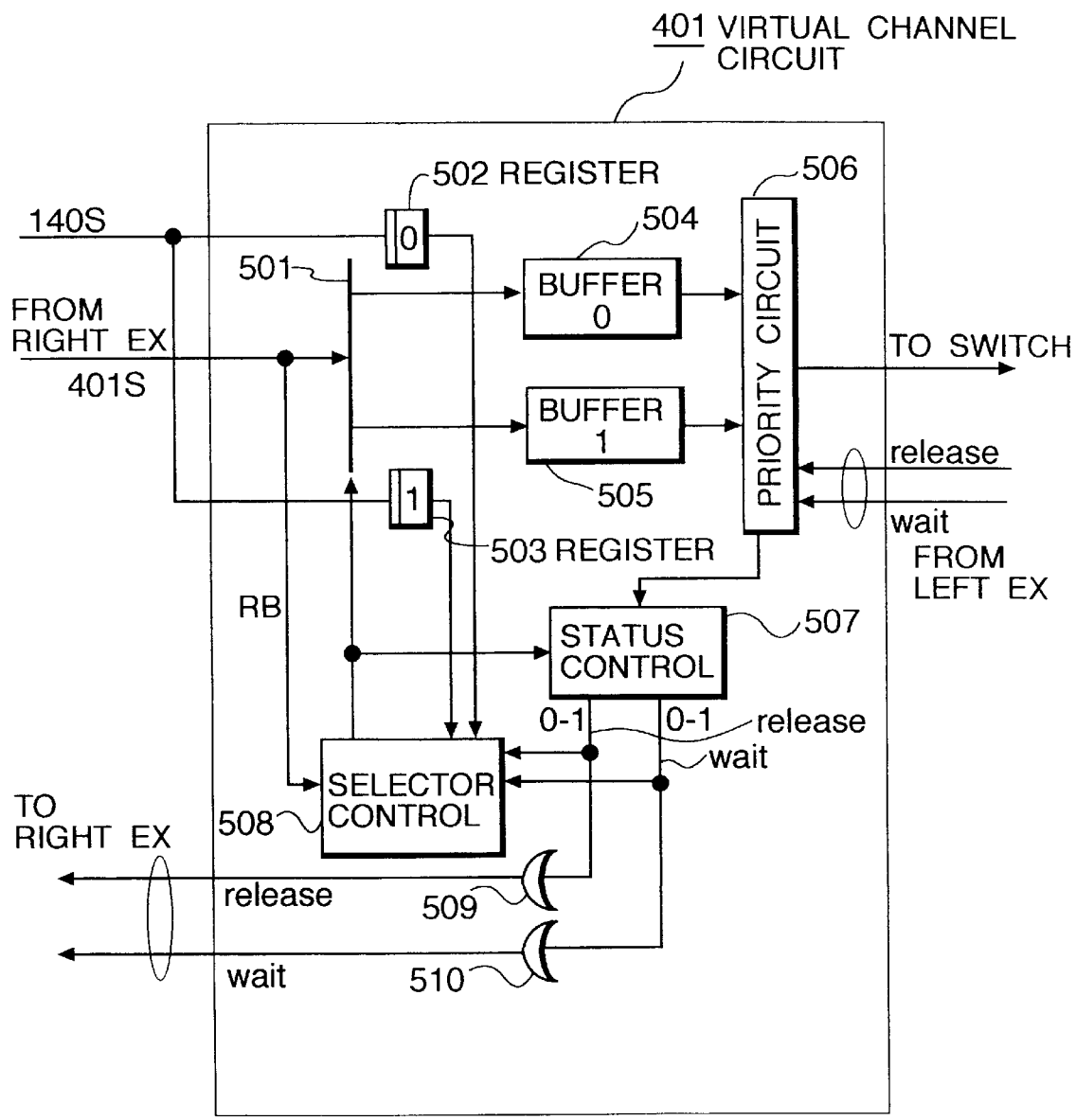
FIG. 5 is a schematic view illustrating the internal constitution of a virtual channel circuit (401) included in FIG. 4.

FIG. 5 schematically illustrates the internal constitution of the virtual channel circuit 401. The virtual channel circuit 401 comprises a selector 501, registers 502 and 503, buffers 504 and 505, a status control circuit 507, a selector control circuit 508, and a priority circuit 506. A signal line 401S connected to the virtual channel circuit 401 receives a message. A signal line 140S connected to the host computer or SVP admits various data to be set for use by the virtual channel circuit 401.

The first embodiment assumes wormhole routing as its switching method. It is thus assumed that the buffers 504 and 505 are not large enough in capacity each to accommodate one message as a whole. This means that one message is transferred through a plurality of buffers in a plurality of switches on the message transfer route. If the destination switch has no free buffers or if its buffers have already accommodated another transferred message, the current message waits for buffers to become available while retaining its current route. Wormhole routing is a known technique and thus will not be discussed further. Details of this technique are described in the second-cited reference.

The registers 502 and 503 hold information for the host computer or SVP 140 to identify buffers in advance. Illustratively, the register 502 holds "0" and the register 503 retains "1." This indicates that the buffers 504 and 505 are intended respectively to accommodate messages whose RB bits are set to "0" and "1." It follows that the buffers 504 and 505 of the first embodiment need not be the same in capacity. Typically, normal messages transmit data but the corresponding response messages have no data, so that the buffer for the response message is allowed to be small in capacity.

The status control circuit 507 verifies whether each of the buffers 504 and 505 is free. In operation, the status control circuit 507 sends to the selector control circuit 508 either a RELEASE signal indicating that the corresponding buffer is free or a WAIT signal indicating that the corresponding buffer is being used. The WAIT and RELEASE signals are issued with respect to each buffer. In FIG. 5, the RELEASE signal is shown as "0-1" and the WAIT signal as "0-1." The RELEASE signal "0-1" and the WAIT signal "0-1" are transmitted through OR gates 509 and 510 respectively to another EX (or PE) connected to the input side of this EX. Basically, the status control circuit 507 controls the status of various buffers using two signals: an output signal from the selector control circuit 508 indicating which buffer the message is placed into, and a signal from the priority circuit 506 (to be described later) indicating from which buffer the message is transferred to the switch.

The selector 501 is a circuit that transfers the received message to the relevant buffer (buffer 504 or 505). The selector 501 is controlled by the selector control circuit 508 that determines the buffer into which to place the received message in accordance with three kinds of information: the output signal from the status control register 507, the information in the registers 502 and 503, and the RB bit in the received message.

The first embodiment has two buffers, the buffer count being equal to the total number of values that the RB bit of the message can take. When the buffer corresponding to the value of the RB bit in the received message is free, the message is written to that buffer. Thus a major characteristic of the first embodiment is that the type of received message to be written to each buffer is determined beforehand by the value of the RB bit.

The priority circuit 506 selects one of the outputs from a plurality of buffers. The priority here may be determined according to message priority or on a time sharing basis such as the round robin method. With the first embodiment, the RB bit is regarded as message priority. A message with RB=1 is given priority over a message with RB=0. The priority circuit 506 operates by responding to the RELEASE and WAIT signals from the message destination EX (PE). On receiving the RELEASE signal, the priority circuit 506 permits message output from the buffer; upon receipt of the WAIT signal, the priority circuit 506 halts message transmission.

Figure 6:
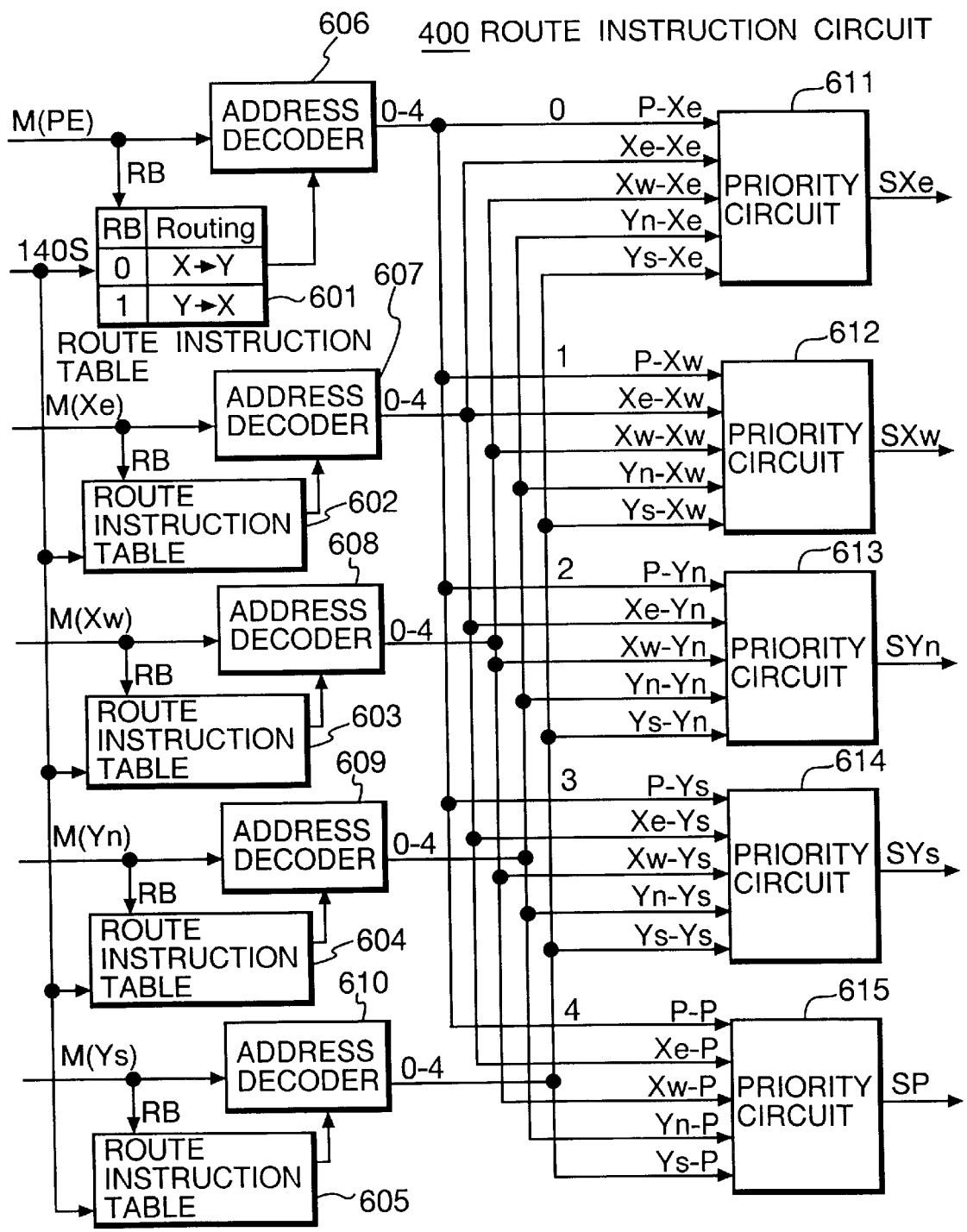
FIG. 6 is a schematic view portraying the internal constitution of a route instruction circuit (400) included in FIG. 4.

FIG. 6 schematically portrays the internal constitution of the route instruction circuit 400. The route instruction circuit 400 comprises route instruction tables 601 through 605, address decoders 606 through 610, and priority circuits 611 through 615. Conventionally, the address decoder determines the message destination by referring only to the receiving PE number in the message. By contrast, an innovation of the first embodiment is that its address decoders 606 through 610 decide the message destination using not only the sending and receiving PE numbers but also the route instruction tables 601 through 605 determined as per the property information RB in the message in question. Specifically, the route instruction tables are established by the signal 140S from the host computer or SVP 140.

Figure 10:
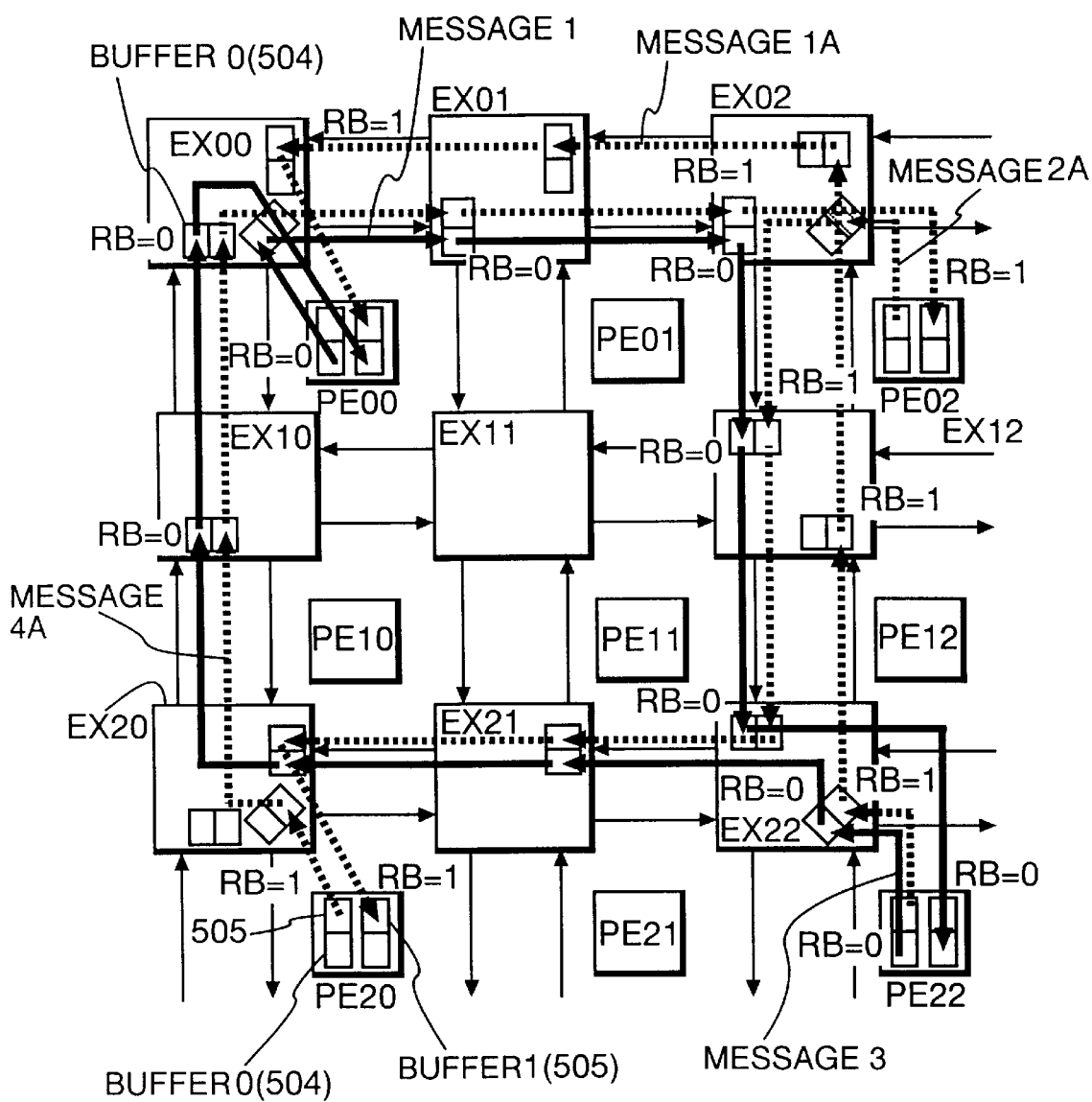
FIG. 10 is a schematic view depicting the flow of messages in the first embodiment.

In FIG. 6, a signal M(PE) is a message signal (receiving PE number and RB bit) received from the PE connected to the EX. Signals M(Me), M(Xw), M(Yn) and M(Ys) are message signals (each comprising the receiving PE number and RB bit) received from the adjacent EXs. Subscripts e, w, n and s indicate positional relations between the current EX and its adjacent EXs. For example, if the EX11 in FIG. 10 is the current EX, then M(Xe) is a message from the EX12, M(Xw) is a message from the EX10, M(Yn) is a message from the EX01, and M(Ys) is a message from the EX21. Output signals P-Xe, Xe-Xe, Xw-Xe, Yn-Xe and Ys-Xe of the address decoders 606 through 610 are messages received from the PE, Xe, Xw, Yn and Ys respectively for transmission to the Xe. Likewise, P-Xw, Xe-Xw, Xw-Xw, Yn-Xw and Ys-Xw indicate that the messages received from PE, Xe, Xw, Yn and Ys are transmitted to Xw; P-Yn, Xe-Yn, Xw-Yn, Yn-Yn and Ys-Yn indicate that the messages received from PE, Xe, Xw, Yn and Ys are transmitted to Yn; P-Ys, Xe-Ys, Xw-Ys, Yn-Ys an Ys-Ys indicate that the messages received from PE, Xe, Xw, Yn and Ys are transmitted to Ys; P-P, Xe-P, Xw-P, Yn-P and Ys-P indicate that the messages received from PE, Xe, Xw, Yn and Ys are transmitted to P.

The route instruction tables 601 through 605 contain the relations between the values of message property information RB and the routing orders, the relations being described therein beforehand by the host computer or SVP 140. Illustratively, with the first embodiment, the tables specify a routing order of the X-to-Y direction when RB=0 and designate a routing order of the Y-to-X direction when RB=1.

The address decoders 606 through 610 transfer the message to one of signals SP, SXe, SXw, SYn and SYs depending on three kinds of information: the receiving PE number, the result of the reference to the route instruction tables 601 through 605, and that number of the EX which is specific thereto and set beforehand by the host computer or SVP 140. FIG. 7 lists typical I/O relations of signals inside the address decoders 606 through 610.

When RB=0, the address decoders operate as described below. In the description that follows, DX and DY denote a coordinate difference each.

Step 1: DX is made equal to the difference between the X coordinate within the receiving PE number of the message and the X coordinate of the current EX.

Step 2: If DX=0, step 3 is reached; if DX≠0, step 6 is reached.

Step 3: DY is made equal to the difference between the Y coordinate within the receiving PE number of the message and the Y coordinate of the current EX.

Step 4: If DY=0, step 5 is reached; if DY≠0, step 7 is reached.

Step 5: The signals P-P, Xe-P, Xw-P, Yn-P and Ys-P are output to the priority circuit 615 that controls the switch 410 connected to the PE.

Step 6: If DX>0, the signals P-Xe, Xe-Xe, Xw-Xe, Yn-Xe and Ys-Xe are output to the priority circuit 611 that controls the switch 406 connected to Xe; if DX<0, the signals P-Xw, Xe-Xw, Xw-Xw, Yn-Xw and Ys-Xw are output to the priority circuit 612 that controls the switch 407 connected to Xw.

Step 7: If DY>0, the signals P-Ys, Xe-Ys, Xw-Ys, Yn-Ys and Ys-Ys are output to the priority circuit 614 that controls the switch 409 connected to Ys; if DY<0, the signals P-Yn, Xe-Yn, Xw-Yn, Yn-Yn and Ys-Yn are output to the priority circuit 613 that controls the switch 408 connected to Yn.

When RB=1, the address decoders operate as follows:

Step 1: DY is made equal to the difference between the Y coordinate within the sending PE number of the message and the Y coordinate of the current EX.

Step 2: If DY=0, step 3 is reached; if DY≠0, step 6 is reached.

Step 3: DX is made equal to the difference between the X coordinate within the sending PE number of the message and the X coordinate of the current EX.

Step 4: If DX=0, step 5 is reached; if DX≠0, step 7 is reached.

Step 5: The signals P-P, Xe-P, Xw-P, Yn-P and Ys-P are output to the priority circuit 615 that controls the switch 410 connected to the PE.

Step 6: If DY>0, the signals P-Ys, Xe-Ys, Xw-Ys, Yn-Ys and Ys-Ys are output to the priority circuit 614 that controls the switch 409 connected to Ys; if DY<0, the signals P-Yn, Xe-Yn, Xw-Yn, Yn-Yn and Ys-Yn are output to the priority circuit 613 that controls the switch 408 connected to Yn.

Step 7: If DX>0, the signals P-Xe, Xe-Xe, Xw-Xe, Yn-Xe and Ys-Xe are output to the priority circuit 611 that controls the switch 406 connected to Xe; if DX<0, the signals P-Xw, Xe-Xw, Xw-Xw, Yn-Xw and Ys-Xw are output to the priority circuit 612 that controls the switch 407 connected to Xw.

Each of the priority circuits 611 through 615 selects one of the five input signals. The priority circuits 611 through 615 then output the signals SXe, SXw, SYn, SYs and SP to the corresponding switches 406 through 410 telling each of them to select and output the message received by the relevant EX from the switch or PE that sent the selected signal. Any one of the priority circuits 611 through 615 selects one signal with priority. That is, with the first embodiment, the priority circuit selects the signal having the property information of RB=1. If none of the messages has the property information of RB=1, they are selected in the order in which they arrived.

Details of message transfer by the first embodiment will now be described. FIG. 10 shows an example in which the first embodiment transfers messages 1, 2a, 3 and 4A from PE00 to PE22, from PE02 to PE20, from PE22 to PE00, and from PE20 to PE02, respectively. The messages 1 and 3 are data transfer messages that carry data to their receiving PEs (response needed/not needed). The message 2A is a response message sent by the receiving PE02 to the sending PE20 notifying the latter that the data transfer message 2 has been received. The message 4A is also a response message sent by the receiving PE20 to the sending PE02 telling the latter that the data transfer message 4 has been received. Reference numeral 504 represents the buffer 0 inside the virtual channel circuit 401, and reference numeral 505 denotes the buffer 1, shown shaded. As mentioned, the first embodiment assumes wormhole routing as its switching method and it is assumed that the buffers 0 and 1 are not large enough in capacity each to accommodate one message as a whole. That is, one message is transferred through a plurality of buffers in a plurality of switches. If the destination switch has no free buffers, the current message waits for new buffers to become available while retaining the previously transited buffers.

The message 1 will now be described. When the CPU inside the sending processor PE00 in FIG. 10 issues a communication instruction, the instruction is decoded as shown in FIG. 3 and transferred to the message controller 303. In the property setup table 305 of the message controller 303, the property information RB is set to 0 because the message to be transmitted is a message to be originated by the current PE. Furthermore, the acknowledgment information ACK is set to 1 because the message requires a response. Using the acknowledgment information ACK, property information RB, the PE address and data, the message generating circuit 304 generates the message 1 in the format 150 of FIG. 1. The message 1 thus generated is placed into the buffer 0 in the virtual channel circuit 307 because RB=0. From there, the message 1 is transferred to the EX00.

What takes place inside the EX00 will now be described with reference to FIGS. 4, 5 and 6. The message 1 coming from the PE00 is transferred to the virtual channel circuit 405 in FIG. 4. As shown in FIG. 5, the value "0" is set in the register 502 corresponding to the buffer 504 and the RB bit in the message 1 is "0." This causes the selector 501 to select an input to the buffer 0. The message 1 is thus placed into the buffer 0. Because the buffer 0 is smaller in capacity than the message 1, that part of the message 1 which is not accommodated in the buffer 0 remains inside the buffer of the PE. Because the property information RB is "0" in the message 1, the route instruction circuit 400 of FIG. 6 selects a routing order of the X-to-Y direction as per the route instruction table 601. The result of the table reference and the receiving PE number are input to the address decoder 606. The address decoder 606 determines the destination of message transfer according to the table of FIG. 7. Since RB=0, the X coordinate "2" within the receiving PE number is compared with the X coordinate "0" of the current EX. The difference DX is +2, which is a mismatch. As a result, the signal P-Xe is output to the priority circuit 611. The priority circuit 611 in turn outputs the signal SXe to the switch 406. Given the signal SXe, the switch 406 to the EX01 in FIG. 4 selects the message from the PE00 and forwards it to the EX01. The message 1 sent to the EX01 is handled thereby in the same manner as by the EX00 and is sent to the EX02.

What takes place inside the EX02 will now be described with reference to FIGS. 4, 5 and 6. The message 1 transferred to the EX02 is placed into the virtual channel circuit 402 of FIG. 4. As shown in FIG. 5, the selector 501 selects an input to the buffer 0 because RB=0 in the message 1. With the RB bit being "0," the route instruction circuit 400 of FIG. 6 selects a routing order of the X-to-Y direction as per the route instruction table 603. The result of the table reference and the receiving PE number are input to the address decoder 608. The address decoder 608 in turn determines the message destination according to the table of FIG. 7. Since RB=0, the X coordinate "2" within the receiving PE number is compared with the X coordinate "2" of the current EX. The result is a match. Then the Y coordinate "2" within the receiving PE number is compared with the Y coordinate "0" of the current EX. The difference DY is +2, which is a mismatch. As a result, the signal Xw-Ys is output to the priority circuit 614. The priority circuit 614 selects this signal and outputs the signal SYs to the switch 409. Given the signal SYs, the switch 409 to the EX12 in the EX02 of FIG. 4 selects the message from the EX01 and forwards it to the EX12. The message sent to the EX12 is handled thereby in the same manner as by the EX02 and is sent to the EX22.

What takes place inside the EX22 will now be described with reference to FIGS. 4, 5 and 6. The message 1 transferred to the EX22 is placed into the virtual channel circuit 403 of FIG. 4. As shown in FIG. 5, the selector 501 selects an input to the buffer 0 because RB=0 in the message 1. With the RB bit being "0," the route instruction circuit 400 of FIG. 6 selects a routing order of the X-to-Y direction as per the route instruction table 604. The result of the table reference and the receiving PE number are input to the address decoder 609. The address decoder 609 in turn determines the message destination according to the table of FIG. 7. Since RB=0, the X coordinate "2" within the receiving PE number is compared with the X coordinate "2" of the current EX. The result is a match. Then the Y coordinate "2" within the receiving PE number is compared with the Y coordinate "2" of the current EX, which also results in a match. This causes the signal Yn-P to be output to the priority circuit 615. The priority circuit 615 selects this signal and outputs the signal SP ("1") to the switch 410 shown in FIG. 4. Given the signal SP, the switch 410 selects the message from the EX12 and forwards it to the processor PE22 to which the switch 410 is connected.

Figure 3:
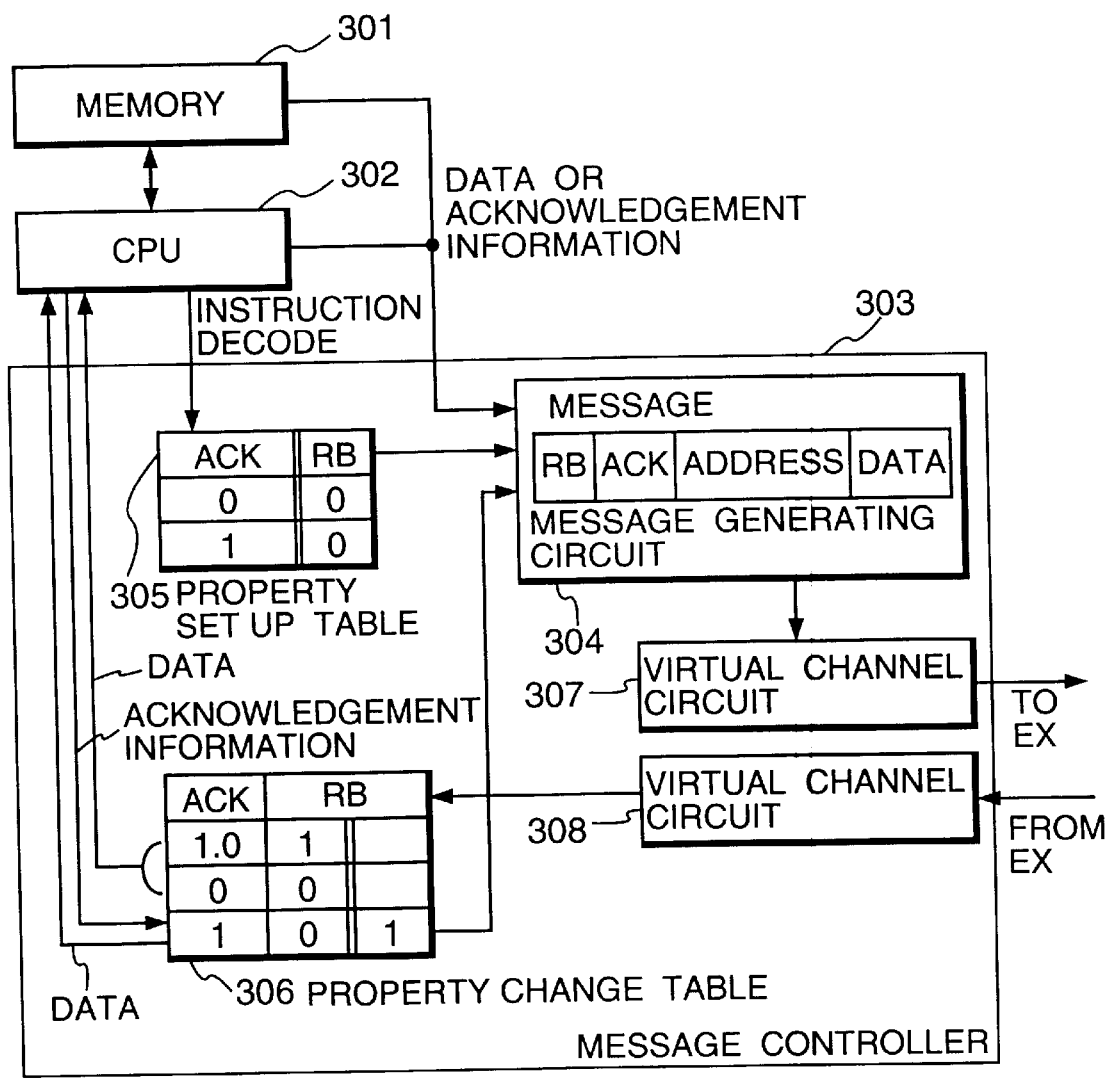
FIG. 3 is a schematic view depicting the constitution of a processor in the first embodiment.

When the message 1 reaches the PE22, that message is placed into the buffer 0 inside the virtual channel circuit of FIG. 3 because RB=0. With the data written to memory, the acknowledgment information causes the property change table 306 to change the RB bit to "1" because ACK=1 and RB=0 in the received message 1. The message generating circuit then generates the message 1A. Where a response is required, the message carries acknowledgment information instead of data. After being generated, the message 1A is transferred to the virtual channel circuit 307. As shown in FIG. 5, the virtual channel circuit 401 (307 in FIG. 3) places the message 1A into the buffer 1 because RB=1. Since the message 1A from the buffer 1 has priority, the priority circuit 506 halts its ongoing message transfer where applicable from the buffer 0 and sends the message 1A from the buffer 1 to the EX22 instead.

What takes place in the EX22 will now be described with reference to FIGS. 4, 5 and 6. The response message 1A output from the PE22 is transmitted to the virtual channel circuit 405 of FIG. 4. Because RB=1 in the response message 1A and because the value set in the register 503 of FIG. 5 is "1," the selector 501 selects an input to the buffer 1. The response message 1A is thus placed into the buffer 1. Since RB=1 in the response message 1A, the route instruction circuit 400 of FIG. 6 selects a routing order of the Y-to-X direction as per the route instruction table 601. The result of the table reference and the sending PE number are input to the address decoder 606. The address decoder 606 determines the message destination in accordance with the table of FIG. 7. Because RB=1, the Y coordinate "0" within the sending PE number is compared with the Y coordinate "2" of the current EX. The difference DY is −2, which is a mismatch. As a result, the address decoder 606 outputs the signal P-Yn to the priority circuit 613. The priority circuit 613 in turn outputs the signal SYn to the switch 408. Given the signal SYn, the switch 408 in FIG. 4 selects the message from the PE22 and forwards it to the EX12 to which the switch 408 of the EX22 is connected. The message sent to the EX12 is passed on to the EX02.

What takes place inside the EX02 will now be described with reference to FIGS. 4, 5 and 6. The response message 1A is transferred to the virtual channel circuit 404 of FIG. 4. As shown in FIG. 5, the selector 501 selects the buffer 1 because RB=1 in the response message and because the value set in the register 503 is "1." The response message 1A is placed into the buffer 1. Since RB=1 in the response message 1A, the route instruction circuit 400 of FIG. 6 selects a routing order of the Y-to-X direction as per the route instruction table 605. The result of the table reference and the sending PE number are input to the address decoder 610. The address decoder 610 in turn determines the message destination in accordance with the table of FIG. 7. Since RB=1, the Y coordinate "0" within the sending PE number is compared with the Y coordinate "0" of the current EX. The result is a match, so that the X coordinate "0" within the sending PE number is compared next with the X coordinate "2" of the current EX. The difference DX is −2, which is a mismatch. As a result, the signal Ys-Xw is output to the priority circuit 612. The priority circuit 612 in turn outputs the signal SXw to the switch 407. Given the signal SXw, the switch 407 in FIG. 4 selects the message from the EX12 and forwards it to the EX01 to which the switch 407 of the EX02 is connected. The message 1A sent to the EX01 is passed on to the EX00.

What takes place inside the EX00 will now be described with reference to FIGS. 4, 5 and 6. The response message is transferred to the virtual channel circuit 401 of FIG. 4. As shown in FIG. 5, the selector 501 selects an input to the buffer 1 because RB=1 in the response message and because the value set in the register 503 is "1." The response message 1A is placed into the buffer 1. Since RB=1, the route instruction circuit 400 of FIG. 6 selects a routing order of the Y-to-X direction as per the route instruction table 602. The result of the table reference and the sending PE number are input to the address decoder 607. The address decoder 607 in turn determines the message destination in accordance with the table of FIG. 7. Since RB=1, the Y coordinate "0" within the sending PE number is compared with the Y coordinate "0" of the current EX. The result is a match, so that the X coordinate "0" within the sending PE number is compared next with the X coordinate "0" of the current EX. Because the latter comparison also results in a match, the address decoder 607 outputs the signal Xc-P to the priority circuit 615. The priority circuit 615 in turn outputs the signal SP to the switch 410. Given the output signal SP, the switch 410 of FIG. 4 selects the message from the EX01 and forwards it to the PE00.

Because RB=1, the response message 1A having reached the PE00 is placed into the buffer 1 inside the virtual channel circuit 308. Since RB=1 in the property change table 306, the message 1A is transferred to the CPU. Given the message 1A, the CPU verifies completion of the data transfer and moves on to the next processing.

As described, the message 1 is transferred through the route of: PE00 (buffer 0)→EX00 (buffer 0)→EX01 (buffer 0)→EX02 (buffer 0)→EX12 (buffer 0)→EX22 (buffer 0)→PE22 (buffer 0).

The response message 1A issued in response to the message 1 is transferred through the route of: PE22 (buffer 1)→EX22 (buffer 1)→EX21 (buffer 1)→EX20 (buffer 1)→EX10 (buffer 1)→EX00 (buffer 1)→PE00 (buffer 1).

The message 3 is a message requiring no response (ACK=0) from the PE22 to the PE00. The PE22 sets the RB bit to "0" using the property setup table and has the message generating circuit 304 generate the message 3. The message 3 thus generated is transferred to the virtual channel circuit 307. Since RB=0 in the message 3, the virtual channel circuit 307 (see FIG. 5) places the message into the buffer 0 (504 in FIG. 5). The message 3 is then sent from the priority circuit 506 to the EX22. The workings inside the EX22, EX21, EX20, EX10 and EX00 are the same as in the case of the message 1. The message 3 transferred to the EX20 is forwarded from there to the virtual channel circuit 308. Because RB=0 in the message 3, the virtual channel circuit 308 (see FIG. 5) places the message into the buffer 0 (FIG. 5). The message 3 is then output from the priority circuit 506. Because ACK=0 and RB=0 in the property change table 306 in FIG. 3, the CPU 302 gets the information and thereby moves on to the next processing. Thus the message 3 is transferred through the route of: PE22 (buffer 0)→EX22 (buffer 0)→EX21 (buffer 0)→EX20 (buffer 0)→EX10 (buffer 0)→EX00 (buffer 0)→PE00 (buffer 0).

The message 2A will now be described. The message 2A is a response message for acknowledging the receipt of the preceding message 2. For this reason, the RB bit is changed to "1" in the property change table 306 of the PE02, and the message generating circuit 304 generates the message 2A. The message 2A thus generated is sent to the virtual channel circuit 308. Since RB=1 in the message 2A, the virtual channel circuit 308 (see FIG. 5) places the message 2A into the buffer 1. Because the message 2A from the buffer 1 has high priority (i.e., RB=1 in the message 2A), the priority circuit 506 halts its ongoing message transfer where applicable from the buffer 0 and sends the message 2A from the buffer 1 to the EX02 instead. The workings inside the EX02, EX12, EX22, EX21 and EX20 are the same as in the case of the message 1. It should be noted that the buffer 1 is always selected in the virtual channel circuit of FIG. 5 because RB=1. If the message 1 was previously sent to the buffer 0 in the virtual channel circuit of the EX12 and if the message 3 was previously transferred to the buffer 0 in the virtual channel circuit of the EX22, the priority circuit 506 causes the message 2A to be first sent out of the buffer 1 because the message 2A (with RB=1) has higher priority than the messages 1 and 2 (with RB=0). That is, even where the same transfer route is used, no deadlock occurs because messages with different routing orders use different buffers. The message 2A sent to the PE20 is transferred to the virtual channel circuit 308. Because RB=1 in the message 2A, the virtual channel circuit 308 in FIG. 5 places the message into the buffer 1. The message 2A is output from the priority circuit 506. Since ACK=1 and RB=1 in the property change table 306, the information is sent to the CPU 302. Given the information, the CPU 302 verifies the arrival of the data and moves on to the next processing. Thus the message 2A is transferred through the route of: PE02 (buffer 1)→EX02 (buffer 1)→EX12 (buffer 1)→EX22 (buffer 1)→EX21 (buffer 1)→EX20 (buffer 1)→PE20 (buffer 1).

The message 4A is another response message issued in response to the preceding message 4. Thus the RB bit is changed to "1" in the property change table 306 of the PE20, ad the message generating circuit 304 generates the message 4A. The message 4A thus generated is sent to the virtual channel circuit 307. Since RB=1 in the message 4A, the virtual channel circuit 307 (see FIG. 5) places the message into the buffer 1. Because the message 4A has high priority (RB=1), the priority circuit 506 halts its ongoing message transfer where applicable from the buffer 0 and sends the message 4A from the buffer 1 to the EX20 instead. The workings inside the EX20, EX10, EX00, EX01 and EX02 are the same as in the case of the message 1. It should be noted that the buffer 1 is always selected in the virtual channel circuit of FIG. 5 because RB=1. If the message 3 was previously sent to the buffer 0 in the virtual channel circuit of the EX10 and if the message 1 was previously transferred to the buffer 0 in the virtual channel circuit of the EX01, the priority circuit 506 causes the message 4A to be first sent out of the buffer 1 because the message 4A (with RB=1) has higher priority than the messages 1 and 3 (with RB=0). That is, where the same transfer route is used, no deadlock occurs because messages with different routing orders use different buffers. The message 4A sent to the PE02 is transferred to the virtual channel circuit 308. Because RB=1 in the message 4A, the virtual channel circuit 308 in FIG. 5 places the message into the buffer 1. The message 4A is output from the priority circuit 506. Since ACK=1 and RB=1 in the property change table 306, the information is sent to the CPU 302. Given the information, the CPU 302 verifies the arrival of the data and moves on to the next processing. Thus the message 4A is transferred through the route of: PE20 (buffer 1)→EX20 (buffer 1)→EX10 (buffer 1)→EX00 (buffer 1)→EX01 (buffer 1)→EX02 (buffer 1)→PE02 (buffer 1).

With the first embodiment, as described, the processors each incorporate tables for setting or changing message property information based on communication instructions, and the exchange switches each incorporate tables for determining the routing order in accordance with the message property information. The arrangements make it possible to utilize hitherto unused routes for message transfer. With a plurality of routes on the network used to transfer a given message, it is easy to distribute the loads on the transfer routes within the network as equally as possible. Because a plurality of virtual channels are employed with respect to different types of messages, possible conflict between these message is eased. With a plurality of virtual channels furnished regarding different kinds of property information (i.e., multiple buffers), the virtual channel circuit to be used is determined uniquely based on the property information in question. This suppresses the deadlock state. Once a message is output from a processor, the message reaches the receiving processor with no need to add the information thereto about the exchange switches it has transited as is described in the first-cited reference. This reduces the circuit complexity considerably as opposed to that of conventional setups based on adaptive routing. Although the first embodiment uses the two-dimensional mesh-connected network, this is not limitative of the embodiment. The first embodiment may also be applied to n-dimensional network constitutions.

Figure 8:
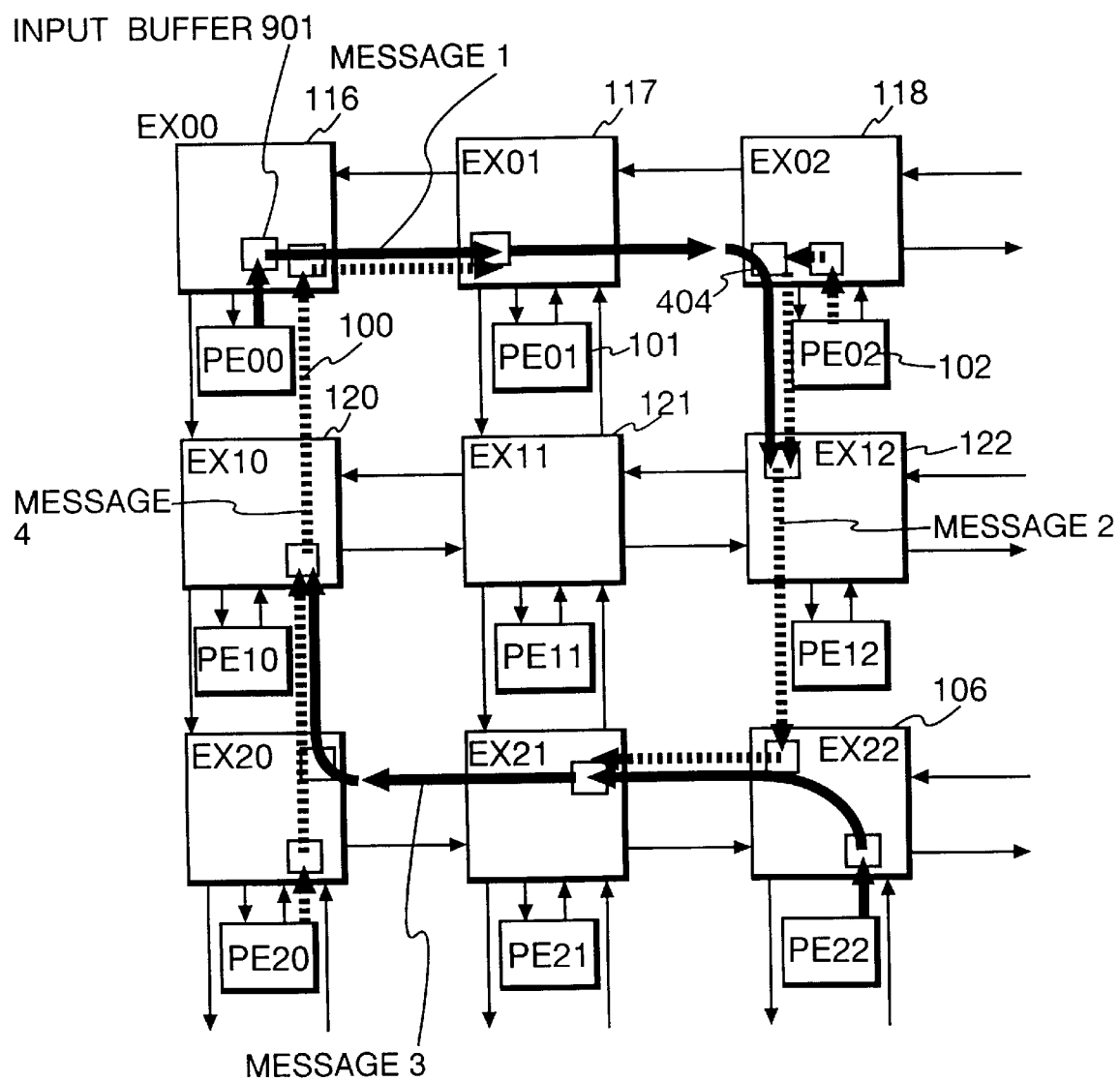
FIG. 8 is a schematic view indicating the flow of messages on a conventional mesh-connected network with no virtual channels.
Figure 9:
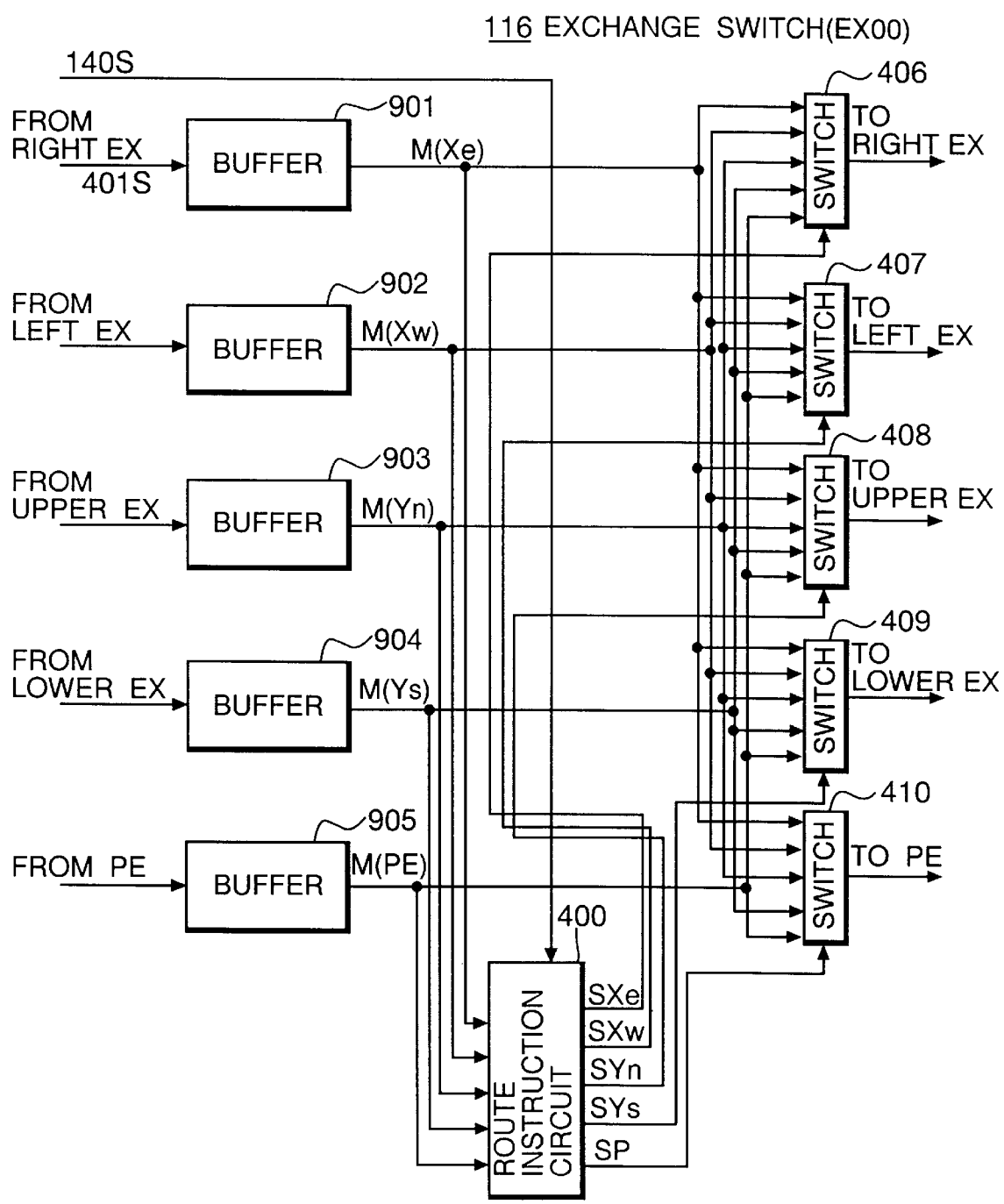
FIG. 9 is a schematic view showing the internal constitution of an exchange switch included in the conventional mesh-connected network with no virtual channels.

Described below for comparison is how messages are transferred over a mesh-connected network without the use of a plurality of virtual channel circuits. FIG. 8 depicts one such mesh-connected network. This example shows that messages 1, 2, 3 and 4 are being transferred from PE00 to PE22, from PE02 to PE20, from PE22 to PE00, and from PE20 to PE02. As shown in FIG. 9, each of the EXs on this network has individually furnished buffers 901 through 905 instead of virtual channel circuits. That is, only one buffer is provided for one input port. Since the example of FIG. 8 assumes the use of wormhole routing, the capacity of each buffer is smaller than each message. One message is transferred through a plurality of buffers. If the destination switch has no free buffer or if the destination switch is transferring another message, the current message waits for buffers of the destination switch to become available while retaining the previously transited buffers. The message 1, having retained the buffers 901 in the EX00, EX01 and EX02, is trying to obtain a buffer of the EX12. The message 2, having secured buffers in the EX02, EX12 and EX22, is trying to get a buffer of the EX21. The message 3, which retained buffers in the EX22, EX21 and EX20, is attempting to acquire a buffer in the EX10. The message 4, which secured buffers in the EX20, EX10 and EX00, is attempting to acquire a buffer in the EX01. In this state, as shown in FIG. 8, each message is trying to acquire a buffer in the transfer routes (EX12, EX21, EX10, EX01) already retained by the other messages. The result is a deadlock.

Second Embodiment

The second embodiment of the invention is a variation of the first embodiment made up of a parallel computer based on a mesh-connected network. The second embodiment determines the routing order according to the priority information set for each of different types of message, as opposed to the first embodiment that changes the routing order as per the property information RB in each message. The messages fall into four categories: emergency message, normal data transfer message, synchronization message, and broadcast message. As with the first embodiment, the second embodiment uses a plurality of transfer routes for transferring these types of messages over the network so that the loads on the transfer routes are distributed as equally as possible. The second embodiment also eases possible conflict between different types of messages as they are transferred over the network. Furthermore, the second embodiment implements a deadlock-free network whose circuit complexity is less than that of the conventional adaptive routing scheme. Because different types of messages are addressed by virtually furnished networks, the cost involved therein is significantly lower than if separate networks are provided. The description that follows centers on the differences between the first embodiment and conventional schemes on the one hand, and the second embodiment on the other.

FIGS. 11A, 11B and FIG. 11C show the constitution of a parallel computer practiced as the second embodiment of the invention. FIG. 11C schematically depicts a three-dimensional constitution of a mesh-connected network identical to that of the first embodiment. In FIG. 11C, reference numeral 1100 indicates the structure of a PE. The second embodiment utilizes a priority setup table 1101 of FIG. 11B in place of the property setup and property change tables of the PE in the first embodiment. The second embodiment is also characterized by the use of a novel message format 1102 in FIG. 11A. The priority setup tale 1101 holds property information taken from communication instruction codes set from the CPU. The messages include broadcast, synchronization and emergency messages in addition to the normal data transfer message. The emergency message is used to send information to other processors in an emergency. The second embodiment handles the four types of messages whose priority information is set as follows: 001 for the normal message, 010 for the emergency message, 100 for the broadcast message, and 111 for the synchronization message. The greater the value of the information, the higher the priority of the message. The RB and ACK bits of the first embodiment are replaced by the priority information (PR) made up of one or more bits (illustratively 3 bits for the second embodiment). As with the first embodiment, the second embodiment causes the message generating circuit 304 (FIG. 3) to generate messages. The priority setup table 1101 of FIG. 11B replaces the property setup table 305 (FIG. 3) in determining the priority information about each message by use of the decoded result of received instructions.

Each EX of the second embodiment is implemented by modifying that of the first embodiment into one adapted to a three-dimensional network. Specifically, each switch is additionally furnished with input and output ports. The workings of each EX in the second embodiment are the same as those in the first embodiment. The difference lies in the structures of virtual channel circuits 1110 through 1116 and of route instruction tables 1120 through 1126. The structures of the virtual channel circuits and route instruction tables vary with the message type. Although the second embodiment is a parallel computer based on a three-dimensional network constitution, this is not limitative of the embodiment. The second embodiment may also be applied to n-dimensional network constitutions.

Figure 12:
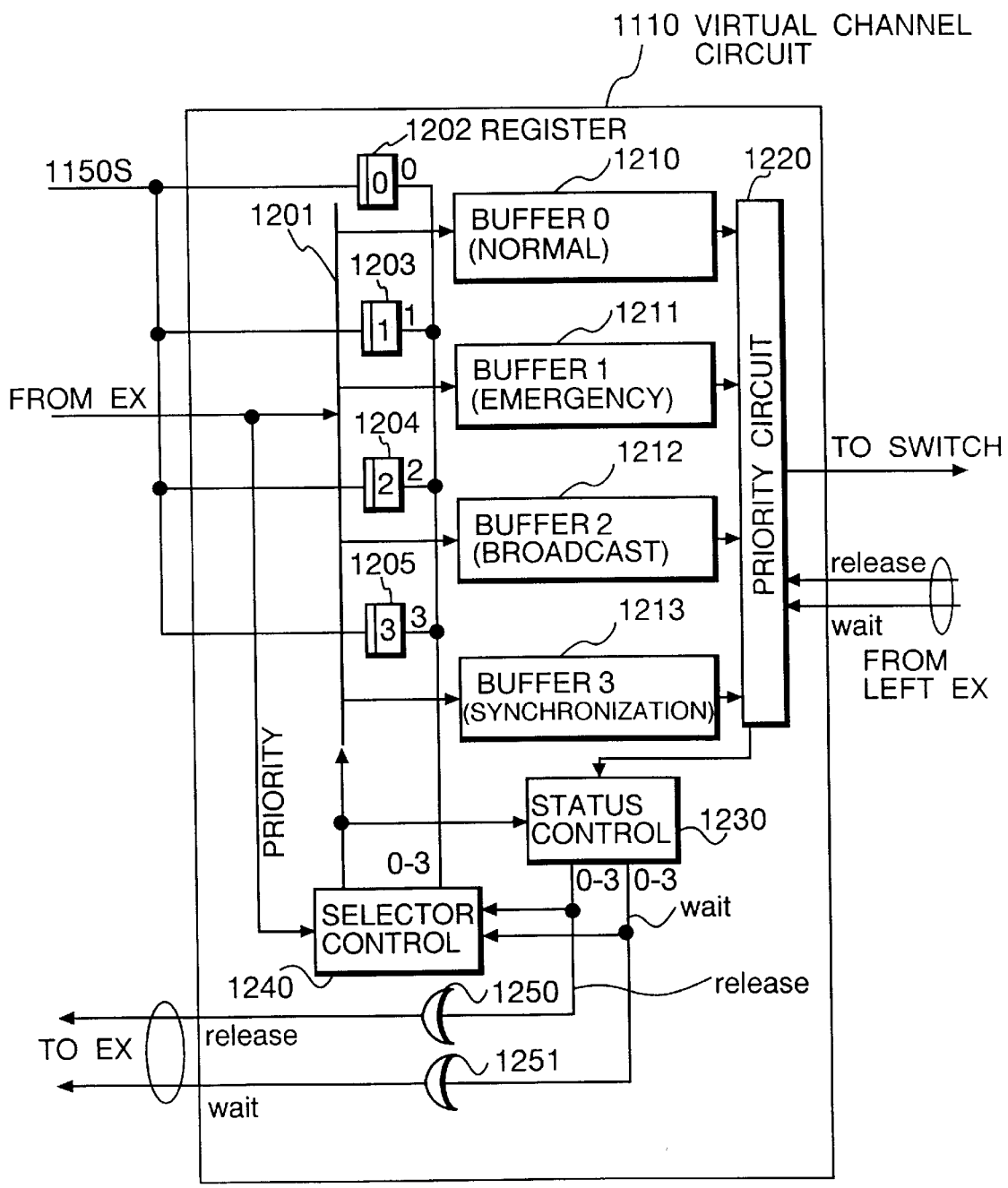
FIG. 12 is a schematic view indicating the internal constitution of a virtual channel circuit included in FIG. 11C.

FIG. 12 schematically shows the virtual channel circuit 1110. The virtual channel circuit of the second embodiment differs from its counterpart of the first embodiment in two points: a selector 1201 selects the signal using priority information instead of property information RB, and there exist as many buffers as the different types of messages. Since four types of messages are assumed for the second embodiment, there are four buffers provided in the virtual channel circuit.

FIG. 13 shows a route instruction table 1120. Unlike its counterpart of the first embodiment, the route instruction table of the second embodiment sets routing orders by use of priority information composed of a plurality of bits and not according to the property information RB. It follows that the greater the variety of message types, the larger the table.

With the above-described differences from the first embodiment taken into account, how the second embodiment transfers messages is easy to understand and will not be discussed further.

The virtual channel circuit in FIG. 12 determines the buffer to be used depending on the priority of the current message. This scheme averts the kind of deadlock discussed in connection with the first embodiment, makes the control circuit constitution simpler than that for conventional adaptive routing, and provides virtual networks instead of separately furnished physical networks to deal with the different types of messages. This results in significant savings in the cost of network hardware.

Although the second embodiment is implemented in the form of a parallel computer based on a three-dimensional mesh-connected network, this is not limitative of the embodiment. The second embodiment may also be applied to parallel computers having an n-dimensional mesh-connected network. In the latter case, priority information may be set according to the message type, a virtual channel may be furnished according to the priority, and routing orders may be established in the route instruction table in terms of priority. The RB bit information in the property setup table, discussed in connection with the first embodiment, may be provided using a plurality of bits. In such an RB bit format, the least significant bit may be used to designate the message and the need or no need for a response thereto. These modifications may coexist in the second embodiment.

Third Embodiment

The third embodiment is a variation of the first embodiment as the latter is applied to a parallel computer based on a hyper-crossbar network. Compared with the first embodiment based on the mesh-connected network, the third embodiment uses a hyper-crossbar network which operates at a higher speed than its mesh-connected counterpart and which also offers the same benefits as those of the first embodiment. The description that follows will center on the differences between the third embodiment on the one hand, and the first embodiment and conventional setups on the other.

Figure 14:
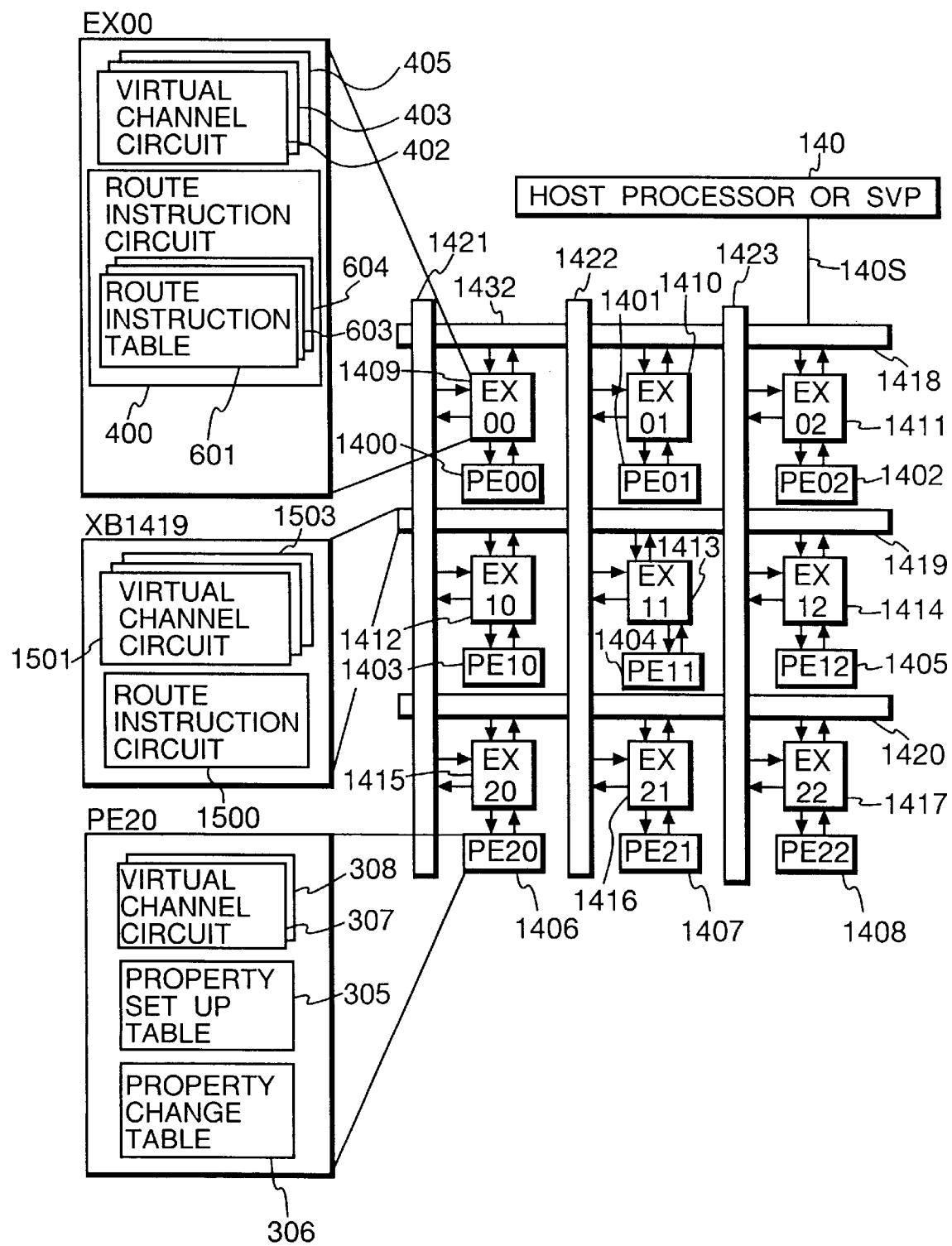
FIG. 14 is a schematic view sketching the constitution of a parallel computer practiced as a third embodiment of the invention.

FIG. 14 schematically shows the constitution of a parallel computer practiced as the third embodiment of the invention. In FIG. 14, reference numerals 1400 through 1408 represent PEs; 1418 through 1420 indicate cross-bar switches in the X axis direction (abbreviated to X-XBs hereunder); and 1421 through 1423 denote cross-bar switches in the Y axis direction (abbreviated to Y-XBs hereunder). The cross-bar switches may each be called simply an XB if no directional distinction is made therebetween. Reference numerals 1409 through 1417 are exchange switches (abbreviated to EXs) furnished at the points of intersection between X-XBs and Y-XBs. The combinations of the XBs and EXs as a whole form the so-called hyper-crossbar network.

The PEs and EXs in the third embodiment are numbered in the same way as in the first embodiment. Each X-XB is attached to the PEs having the same Y coordinate and is thus called Xi-XB, "i" being the Y coordinate. Each Y-XB is attached to the PEs having the same X coordinate and is thus called Yj-XB, "j" being the X coordinate. Although this parallel computer has three groups of PEs arranged in the Y axis direction, each group comprising three PEs arranged in the X axis direction, any number of PEs may be used to constitute a parallel computer in practice.

The structure and the workings of each PE in the third embodiment are the same as those in the first embodiment.

The EXs are each a circuit that transfers a message sent from the corresponding PE, X-XB or Y-XB to a PE, X-XB or Y-XB. Each EX has the same constitution as the exchange switch (FIG. 4) of the first embodiment. That is, of the components constituting the EX in FIG. 4, the input lines from the left EX and upper EX may be regarded as those from the EXs left of and above the current EX, respectively; the output lines to the left EX and upper EX may be considered those to the EXs left of and above the current EX, respectively. As a result, the EXs of the third embodiment each have the virtual channel circuits 402, 403 and 404; the switches 407, 408 and 410; and the route instruction circuit 400 in FIG. 4. The virtual channel circuits 401 and 404 and the switches 406 and 409 are absent. Of the components making up the route instruction circuit 400 of the first embodiment in FIG. 6, the route instruction tables 601, 603 and 604; the address decoders 606, 608 and 609; and the priority circuits 612, 613 and 615 are included in the third embodiment. The route instruction tables 602 and 605; the address decoders 607 and 610; and the priority circuits 611 and 614 are not included in the third embodiment.

Below is a description of how the address decoders operate in the route instruction circuit 400 inside each EX. When RB=0, the address decoders operate as follows:

Step 1: DX is made equal to the difference between the X coordinate within the receiving PE number of the message and the X coordinate of the current EX.

Step 2: If DX=0, step 3 is reached; if DX≠0, step 6 is reached.

Step 3: DY is made equal to the difference between the Y coordinate within the receiving PE number of the message and the Y coordinate of the current EX.

Step 4: If DY=0, step 5 is reached; if DY≠0, step 7 is reached.

Step 5: The signals P-P, Xw-P and Yn-P are output to the priority circuit 615 that controls the switch 410 connected to the PE.

Step 6: The signals P-Xw, Xw-Xw and Yn-Xw are output to the priority circuit 612 that controls the switch 407 connected to the crossbar switch X-XE.

Step 7: The signals P-Yn, Xw-Yn and Yn-Yn are output to the priority circuit 613 that controls the switch 408 connected to the crossbar switch Y-XB.

When RB=1, the address decoders operate as follows:

Step 1: DY is made equal to the difference between the Y coordinate within the sending PE number of the message and the Y coordinate of the current EX.

Step 2: If DY=0, step 3 is reached; if DY≠0, step 6 is reached.

Step 3: DX is made equal to the difference between the X coordinate within the sending PE number of the message and the X coordinate of the current EX.

Step 4: If DX=0, step 5 is reached; if DX≠0, step 7 is reached.

Step 5: The signals P-P, Xw-P and Yn-P are output to the priority circuit 615 that controls the switch 410 connected to the PE.

Step 6: The signals P-Yn, Xw-Yn and Yn-Yn are output to the priority circuit 613 that controls the switch 408 connected to the crossbar switch Y-XB.

Step 7: The signals P-Xw, Xw-Xw and Yn-Xw are output to the priority circuit 612 that controls the switch 407 connected to the crossbar switch X-XB.

Figure 15:
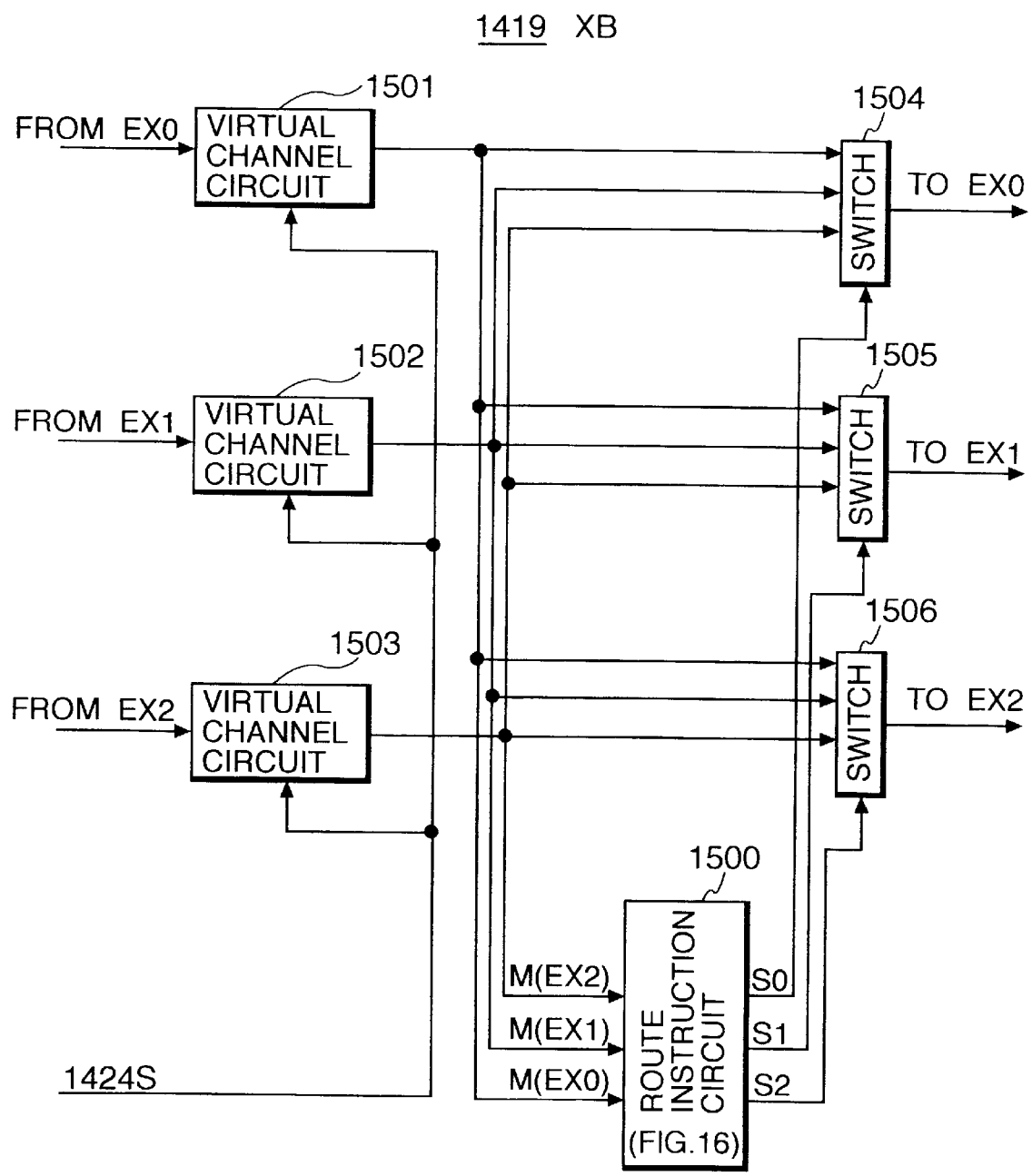
FIG. 15 is a schematic view expressing the internal constitution of a crossbar switch included in FIG. 14.
Figure 16:
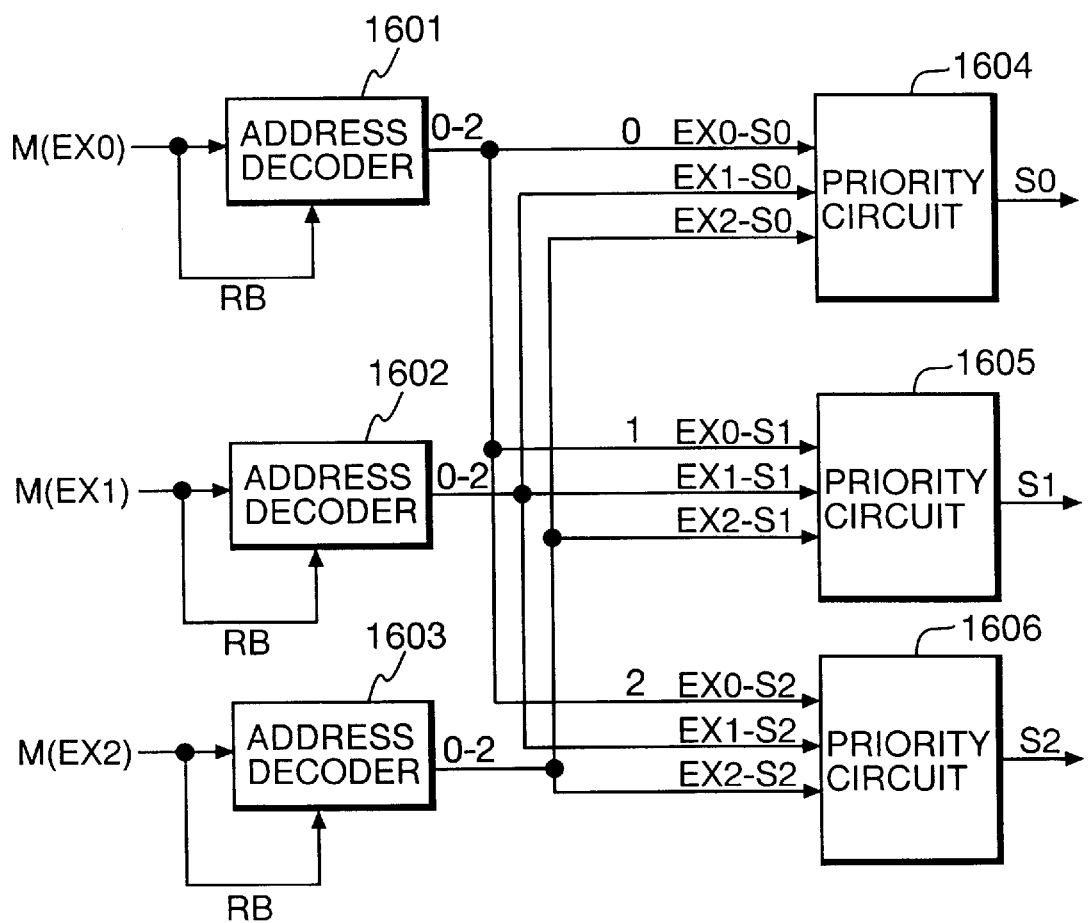
FIG. 16 is a schematic view describing the constitution of an exchange switch included in FIG. 14.

The constitution of the crossbar switch XB will now be described. Each XB is a circuit that transfers the message entered through an input port to an output port. FIG. 15 schematically shows the constitution of the X-axis direction crossbar switch Xi-XB (i=0, 1 or 2). The same constitution also applies to the Y-axis direction crossbar switch. The crossbar switch Xi-XB comprises a route instruction circuit 1500, virtual channel circuits 1501 through 1503, and switches 1504 through 1506. Each of the virtual channel circuits is identical to that shown in FIG. 5. Using the destination address in the message, the route instruction circuit 1500 determines from which switch the input message is to be transferred. The switches 1504 through 1506 select one of three input ports. Input/output signals EX0 through EX2 in FIG. 15 are signals coming from the EXi0 through EXi2 connected to the current XB. With the X0-XB, for example, the I/O signals EX0 through EX2 are replaced by EX00 through EX02 respectively. With the Y0-XB, the I/O signals EX0 through EX2 are replaced by EX20 through EX00 respectively. Since the XB is a crossbar switch, the inputs EX0 through EX2 are connected unmodified to the switches 1504 through 1506. Any message entered through one of the input ports is transferred unchanged to the switches 1504 through 1506. The route instruction circuit 1500 is similar in constitution to the route instruction circuit 400 of FIG. 6. What makes the route instruction circuit 1500 different from its counterpart in FIG. 6 is that it has no route instruction tables. That is, as shown in FIG. 16, the route instruction circuit 1500 is composed of address decoders 1601 through 1603 and priority circuits 1604 through 1606. Based on the property information RB in the message, the address decoders 1601 and 1602 decode the route information contained therein to determine the destination. The priority circuits 1604 through 1606 select one of the three input messages, and output signals S0, S1 and S2. In this example, the messages are selected in the order in which they arrived. It should be noted that the message with RB=1 is given priority over the message with RB=0 when transferred.

Figure 17:
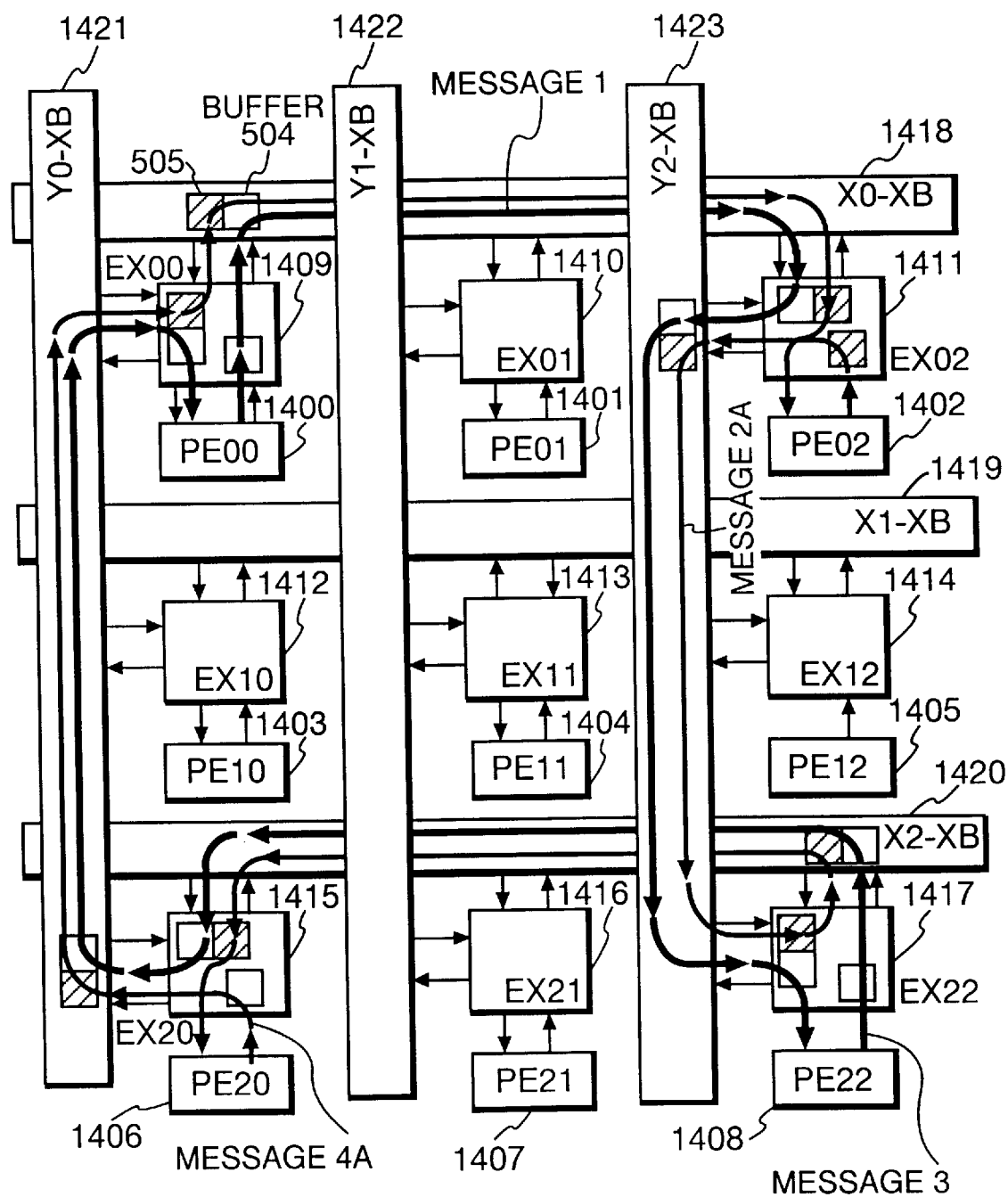
FIG. 17 is a schematic view showing the flow of messages in the third embodiment.

How the third embodiment transfers messages will now be described. As with the first embodiment, the third embodiment transfers each message by wormhole routing. FIG. 17 depicts a setup in which messages 1, 2A, 3 and 4A are transferred concurrently from PE00 to PE22, from PE02 to PE20, from PE22 to PE00, and from PE20 to PE02, respectively. Reference numeral 504 represents the buffer 0, and reference numeral 505 denotes the buffer 1, shown shaded.

In the setup of FIG. 17, the message 1 generated by the sending processor PE00 has the RB bit set to "0" therein as with the first embodiment. The message 1 is first sent to the EX00 which operates in the same manner as with the first embodiment. The message 1 is placed into the buffer 0 inside the virtual channel circuit 405 attached to the input terminal connected to the PE00. As in the case of the first embodiment, the address decoder in the route instruction circuit 400 compares the X coordinate "2" within the receiving PE number with the X coordinate "0" of the current EX. The result is a mismatch, so that the signal P-Xw is output to the priority circuit 612. The priority circuit 612 in turn outputs the signal SXw; the message 1 is transferred from the switch to the X0-XB.

What takes place in the X0-XB will now be described with reference to FIGS. 15 and 16. As shown in FIG. 16, the address decoder 1601 in the route instruction circuit 1500 decodes the receiving PE number and outputs a signal EX0-S2 to the priority circuit 1606. In turn, the priority circuit 1606 outputs a signal S2 specifying that the message from EX0 be output to the EX2. As depicted in FIG. 15, the message from the EX00 is selected by the switch 1506 in accordance with the signal S2. The selected message is transferred to the EX02.

The EX02 works in the same manner as with the first embodiment. The message 1 is placed into the buffer 0. As in the case of the first embodiment, the address decoder in the route instruction circuit 400 compares the X coordinate "2" within the receiving PE number with the X coordinate "2" of the current EX. The result is a match, so that the Y coordinate "2" within the receiving PE number is compared with the Y coordinate "0" of the current EX. The result is a mismatch, so that the signal Xw-Yn is output to the priority circuit 613. The priority circuit 613 in turn outputs the signal SYn; the message 1 is transferred from the switch to the Y2-XB.

What takes place in the Y2-XB will now be described with reference to FIGS. 15 and 16. As shown in FIG. 16, the address decoder 1601 in the route instruction circuit 1500 decodes the receiving PE number and outputs a signal EX2-S2 to the priority circuit 1606. In turn, the priority circuit 1606 outputs the signal S2 specifying that the message from EX02 be output to the EX22. As depicted in FIG. 15, the message 1 from the EX02 is selected by the switch 1506 in accordance with the signal S2. The selected message is transferred to the EX22.

The EX22 operates in the same manner as with the first embodiment. The message 1 is placed into the buffer 0. As in the case of the first embodiment, the address decoder in the route instruction circuit 400 compares the X coordinate "2" within the receiving PE number with the X coordinate "2" of the current EX. The result is a match, so that the Y coordinate "2" within the receiving PE number is compared with the Y coordinate "2" of the current EX. The result is also a match, so that the signal Yn-P is output to the priority circuit 615. The priority circuit 615 in turn outputs the signal SP; the message 1 is transferred from the switch to the PE22 according to the signal SP. The response to the message 1 is transmitted in the same way as with the first embodiment. The messages 2A, 3 and 4A are also transmitted in the same manner as with the first embodiment.

To sum up, the message 1 is transferred through the route of: PE00 (buffer 0)→EX00 (buffer 0) X0-XB (buffer 0)→EX02 (buffer 0)→Y2-XB (buffer 0)→EX22 (buffer 0). The response message issued in response to message 1 is transferred through the route of: PE22 (buffer 1)→EX22 (buffer 1)→Y2-XB (buffer 1)→EX02 (buffer 1)→X0-XB (buffer 1)→EX00 (buffer 1)→PE00 (buffer 1). The message 3 is transferred through the route of: PE22 (buffer 0)→EX22 (buffer 0), X2-XB (buffer 0)→EX20 (buffer 0)→Y0-XB (buffer 0) EX00 (buffer 0)→PE00 (buffer 0). The message 4A is transferred through the route of: PE20 (buffer 1)→EX20 (buffer 1)→Y0-XB (buffer 1)→EX00 (buffer 1)→X0-XB (buffer 1)→EX02 (buffer 1)→PE02 (buffer 1). The message 2A is transferred through the route of: PE02 (buffer 1)→EX02 (buffer 1)→Y2-XB (buffer 1)→EX22 (buffer 1)→X2-XB (buffer 1)→EX20 (buffer 1)→PE20 (buffer 1). The messages with different routing orders are thus transferred over the physically same routes (shown underlined) but through virtually different routes (via different buffers).

The adaptive routing scheme incorporated in the third embodiment uses multiple buffers based on virtual channel circuits. The buffer to be used is determined uniquely depending on the routing order of the message in question. These features prevent a closed loop from occurring over the routes and suppresses deadlock. The fact that the buffer for accommodating a given message is determined uniquely by each processor makes the adaptive routing of the third embodiment much simpler to control than the conventional adaptive routing scheme that carries out routing dynamically.

Although the third embodiment is explained in connection with a parallel computer based on a two-dimensional hyper-crossbar network, this is not limitative of the embodiment. The third embodiment may also be applied to a parallel computer based on an n-dimensional hyper-crossbar network. Furthermore, instead of being practiced as the parallel computer of the two-dimensional constitution, the invention may also be practiced in the form of an n-dimensional network constitution.

Variations (1) The technique incorporated in the second embodiment may also be applied to the hyper-crossbar network used by the third embodiment.

(2) The wormhole routing scheme adopted by the first, the second and the third embodiment for message transfer purposes may be replaced by the so-called virtual cut-through routing scheme. In that case, each buffer inside the virtual channel circuit is made large enough in capacity to accommodate one message as a whole. Since messages vary in size depending on their types, the size of each buffer need only be adjusted to the type of message which utilizes the buffer in question. If a path conflict occurs, the current message in the wormhole routing setup waits for a downstream buffer to become available while continuously securing the previously transited buffers. In the virtual cut-through routing setup, by contrast, only the buffer currently accommodating the message is affected by the path conflict and no other buffers are affected. That is, the virtual cut-through routing scheme has less conflict between different types of messages than the wormhole routing scheme. On the other hand, the need to provide each EP and each switch with buffers each accommodating one whole message makes it difficult to practice the cut-through scheme where long messages are required to be transmitted.

(3) Although the first, second and third embodiments employ the two-dimensional and three-dimensional mesh-connected networks as well as the two-dimensional hyper-crossbar network, these are not limitative of the invention. Alternatively, a multistage interconnection network or a hypercube network comprising numerous exchange switches may be utilized instead.

(4) It is also possible to use a torus network on which loop structures already exist among the transfer routes. In this setup, the virtual channels required are as many as the number of message types multiplied by 2. The reason for this is that on the torus network, each input port needs at least two virtual channels to avoid deadlock in the presence of loops among the transfer routes over which messages are transmitted through dimension ordered routing. If virtual channels are fixed for each type of message, messages may be transferred through the same routing order. Where the network is of an n-dimensional constitution, up to n! transfer routes are available.

(5) With the first, the second and the third embodiment, once the property information RB or priority information of a given message is determined, the buffer number in the virtual channel circuit and the routing order in the route instruction table are uniquely determined accordingly. Alternatively, the message format may be modified so as to have a buffer number and a routing order set specifically therein. For example, the property information RB may be prepared in two bits, the high-order bit of the two being used to set a buffer number, the low-order bit being employed to establish a routing order. The same applies in the case of the priority information.

The present invention thus provides a parallel computer using a simply structured network allowing loads on message-transferring routes to be as equally distributed as possible.

The present invention also provides a parallel computer using a simply structured network which enables a plurality of types of messages to be transferred while easing possible conflict between different types of messages.

As many apparently different embodiments of this invention may be made without departing from the spirit and scope thereof, it is to be understood that the invention is not limited to the specific embodiments thereof except as defined in the appended claims.

What is claimed is:

1. A parallel processor system, comprising:
   a plurality of processor elements each including a processor; and
   a network which connects said plurality of processor elements for parallel transfer of plural messages therebetween;
   each processor element transmitting a message to said network, said message including property information of a predetermined kind and destination information of a predetermined kind, said property information of said predetermined kind having a value depending upon a type of said message and said destination information of said predetermined kind being related to a destination processor element;
   said network including a plurality of mutually connected switch circuits for transferring a plurality of messages each transmitted by one of said plurality of processor elements;
   each switch circuit including;
      a plurality of input terminals and a plurality of output terminals; and
      a route instruction circuit connected to said plurality of input terminals and said plurality of output terminals, responsive to a message supplied to one of plurality of input terminals for selecting one of said plurality of output terminals to which said message is to be transferred;
   wherein said route instruction circuit included in each of at least a first plurality of switch circuits within said plurality of mutually connected switch circuits executes said selecting of one of said plurality of output terminals, depending upon the destination information of said predetermined kind included in said message;
   wherein said route instruction circuit included in each of at least a second plurality of switch circuits within said plurality of mutually connected switch circuits executes said selecting of one of said plurality of output terminals, depending upon property information of said predetermined kind included in said message.

2. A parallel computer system according to claim 1, wherein each of said at least plural switch circuits can execute a plurality of modes of message transfer operations;
   wherein said property information of said predetermined kind included in a message transmitted by each processor element comprises transfer control information which indicates one of said plurality of modes of message transfer operations to be executed by switch circuits which will be involved in transmission of said message.

3. A parallel computer system according to claim 1, wherein said property information of said predetermined kind included in a message transmitted by each processor element comprises priority information which indicates a priority of said message.

4. A parallel computer system according to claim 1, wherein said property information included in a message transmitted by each processor element varies depending upon whether said message is transmitted by said each processor element on its own initiative or said message is transmitted to a destination processor element of said message as a response to another message transmitted to said each processor element from one of said plurality of processor elements different from said each processor element.

5. A parallel computer system according to claim 1, wherein said property information included in a message transmitted by each processor element has a value depending upon whether said message is an emergency message.

6. A parallel computer system according to claim 5, wherein said property information of said predetermined kind included in a message transmitted by each processor element has a value further depending upon whether said message is a message for synchronization of said processors or a message to be broadcasted to said plurality of processor elements.

7. A parallel computer system according to claim 1,
   wherein said route instruction circuit included in each of at least a third plurality of switch circuits within said plurality of mutually connected switch circuits executes said selecting of one of said plurality of output terminals, depending upon said destination information of said predetermined kind included in said message and said property information of said predetermined kind included in said message.

8. A parallel processor system, comprising:
   a plurality of processor elements each including a processor; and
   a network which connects said plurality of processor elements for parallel transfer of plural messages therebetween;
   each processor element transmitting a message to said network, said message including property information of a predetermined kind and destination information of a predetermined kind, said property information of said predetermined kind having a value depending upon a type of message, said destination information of said predetermined kind being related to a destination processor element of said message;
   said network including a plurality of mutually connected switch circuits for transferring a plurality of messages each transmitted by one of said plurality of processor elements;
   each switch circuit including;
      a plurality of input terminals and a plurality of output terminals,
      a plurality of virtual channel circuits each provided in correspondence to and connected to one of said plurality of input terminals, and
      a route instruction circuit connected to said plurality of virtual channel circuits, responsive to a message supplied by one of said plurality of virtual channel circuits for selecting one of said plurality of output terminals to which said message is to be transferred;

wherein each virtual channel circuit includes;
  a plurality of buffers each for holding at least part of a message;
  a first select circuit responsive to a message supplied to one of said plurality of input terminals to which said each virtual channel circuit is connected for selecting one of said plurality of buffers into which said message is to be held, and
  a second select circuit for selecting one of said plurality of buffers and for outputting a message held in said selected buffer,
wherein said route instruction circuit included in each of at least a first plurality of switch circuits within said plurality of mutually connected switch circuits executes said selecting of one of said plurality of output terminals, depending upon destination information of said predetermined kind included in said message;
wherein said route instruction circuit included in each of at least a second plurality of switch circuits within said plurality of mutually connected switch circuits executes said selecting of one of said plurality of output terminals included in said each switch circuit to which a message supplied to said each switch circuit is to be transferred, depending upon property information of said predetermined kind included in said message.

9. A parallel computer system according to claim 8, wherein said property information of said predetermined kind included in a message transmitted by each processor element comprises priority information.

10. A parallel computer system according to claim 8, wherein said property information of said predetermined kind included in a message transmitted by each processor varies depending upon whether said message is transmitted by said each processor element on its own initiative or said message is transmitted to a destination processor element of said message as a response to another message transmitted to said each processor element from one of said plurality of processor elements different from said each processor element.

11. A parallel computer system according to claim 8, wherein said property information of said predetermined kind included in a message transmitted by each processor element has a value depending upon whether or not said message is an emergency message.

12. A parallel computer system according to claim 11, wherein said property information of said predetermined kind included in a message by each processor element has a value further depending upon whether said message is a message for synchronization of said plurality of processor elements or a message to be broadcasted to said plurality of processor elements.

13. A parallel computer system according to claim 8, wherein at least plural ones of said plurality of buffers of each virtual channel circuit are of mutually different sizes.

14. A parallel computer system according to claim 8, wherein each switch circuit has a control circuit for controlling transfer of a message supplied to said each switch circuit to another one of said plurality of switch circuits, according to one of a worm-hole method, a store-and-forward method and a virtual-cut-through method.

15. A parallel computer system according to claim 8, wherein each of said at least plural switch circuits can execute a plurality of modes of message transfer operations and said property information included in a message transmitted by each processor element comprises transfer control information which indicates one of said plurality of modes of message transfer operations to be executed by switch circuits which will be involved in transmission of said message.

16. A parallel computer system according to claim 8, wherein said route instruction circuit included in each of at least a third plurality of switch circuits within said plurality of mutually connected switch circuits executes said selecting of one of said plurality of output terminals, depending upon said destination information of said predetermined kind included in said message and said property information of said predetermined kind included in said message.

17. A parallel processor system, comprising:
a plurality of processor elements each including a processor; and
a network which connects said plurality of processor elements for parallel transfer of plural messages therebetween;
said network including a plurality of mutually connected switch circuits for transferring a plurality of messages each transmitted by one of said plurality of processor elements;
each switch circuit including;
  a plurality of input terminals and a plurality of output terminals,
  a plurality of virtual channel circuits each provided in correspondence to and connected to one of said plurality of input terminals;
wherein each virtual channel circuit comprises a plurality of buffers each for holding at least part of a message;
wherein a message held in each of said plurality of buffers within said each virtual channel is one of a message type predetermined for said each buffer among a plurality of types of messages transferred by the network to one of said plurality of input terminals connected to said each virtual channel;
wherein at least plural ones of said plurality of buffers of each virtual channel circuit are of mutually different sizes;
wherein a size of each buffer is one adopted to a size of a message of a predetermined type which said each buffer can hold.

18. A parallel processor system, comprising:
a plurality of processor elements each including a processor; and
a network which connects said plurality of processor elements for parallel transfer of plural data therebetween;
each processor element transmitting to said network, data to be transmitted to a destination processor element together with property information of a predetermined kind and destination information of a predetermined kind, said property information of said predetermined kind having a value depending upon a type of said data to be transmitted, and said destination information of said predetermined kind being related to said destination processor element;
said network including a plurality of mutually connected switch circuits for transferring a plurality of data to be transmitted each transmitted by one of said plurality of processor elements;
each switch circuit including;
  a plurality of input terminals and a plurality of output terminals; and
  a route instruction circuit connected to said plurality of input terminals and said plurality of output terminals, responsive to data to be transmitted supplied to one of plurality of input terminals for selecting one of said plurality of output terminals to which said data to be transmitted is to be transferred;

wherein said route instruction circuit included in each of at least a first plurality of switch circuits within said plurality of mutually connected switch circuits executes said selecting of one of said plurality of output terminals, depending upon destination information of said predetermined kind transmitted with said data to be transmitted;

wherein said route instruction circuit included in each of at least a second plurality of switch circuits within said plurality of mutually connected switch circuits executes said selecting of one of said plurality of output terminals, depending upon property information of said predetermined kind transmitted with said data to be transmitted.

19. A parallel computer system according to claim 18, wherein each of said at least plural switch circuits can execute a plurality of modes of data transfer operations;

wherein said property information of said predetermined kind transmitted with said data to be transmitted as transmitted by each processor element comprises transfer control information which indicates one of said plurality of modes of data transfer operations to be executed by switch circuits which will be involved in transmission of said data to be transmitted.

20. A parallel computer system according to claim 18, wherein said property information of said predetermined kind transmitted with data to be transmitted as transmitted by each processor element comprises priority information which indicates a priority of said data to be transmitted.

21. A parallel processor system, comprising:

a plurality of processor elements each including a processor; and a network which connects said plurality of processor elements for parallel transfer of plural data therebetween;

each processor element transmitting to said network, data to be transmitted to a destination processor element, together with property information of a predetermined kind and destination information of a predetermined kind, said property information of said predetermined kind having a value depending upon a type of said data to be transmitted, said destination information of said predetermined kind being related to said destination processor element;

said network including a plurality of mutually connected switch circuits for transferring a plurality of data to be transmitted each transmitted by one of said plurality of processor elements;

each switch circuit including;

a plurality of input terminals and a plurality of output terminals, a plurality of virtual channel circuits each provided in correspondence to and connected to one of said plurality of input terminals, and a route instruction circuit connected to said plurality of virtual channel circuits, responsive to data to be transmitted as supplied by one of said plurality of virtual channel circuits for selecting one of said plurality of output terminals to which said data to be transmitted is to be transferred;

wherein each virtual channel circuit includes;

a plurality of buffers each for holding at least part of data to be transmitted;

a first select circuit responsive to data to be transmitted as supplied to one of said plurality of input terminals to which said each virtual channel circuits is connected for selecting one of said plurality of buffers into which said data to be transmitted is to be held, and a second select circuit for selecting one of said plurality of buffers and for outputting data to be transmitted held in said selected buffer, wherein said route instruction circuit included in each of at least a first plurality of switch circuits within said plurality of mutually connected switch circuits executes said selecting of one of said plurality of output terminals, depending upon destination information of said predetermined kind transmitted with said data to be transmitted;

wherein said route instruction circuit included in each of at least a second plurality of switch circuits within said plurality of mutually connected switch circuits executes said selecting of one of said plurality of output terminals, depending upon property information of said predetermined kind transmitted with said data to be transmitted.

22. A parallel computer system according to claim 21, wherein each of said at least plural switch circuits can execute a plurality of modes of data transfer operations, wherein said property information transmitted with data to be transmitted as transmitted by each processor element comprises transfer control information which indicates one of said plurality of modes of data transfer operations to be executed by switch circuits which will be involved in transmission of said data to be transmitted.

23. A parallel computer system according to claim 21, wherein said property information of said predetermined kind transmitted with data to be transmitted as transmitted by each processor element comprises priority information.

* * * * *